United States Patent
Lu et al.

(10) Patent No.: US 10,937,206 B2
(45) Date of Patent: Mar. 2, 2021

(54) DEEP-LEARNING-BASED SCATTER ESTIMATION AND CORRECTION FOR X-RAY PROJECTION DATA AND COMPUTER TOMOGRAPHY (CT)

(71) Applicant: Canon Medical Systems Corporation, Tochigi (JP)

(72) Inventors: Yujie Lu, Vernon Hills, IL (US); Zhou Yu, Wilmette, IL (US); Jian Zhou, Buffalo Grove, IL (US); Tzu-Cheng Lee, Mundelein, IL (US); Richard Thompson, Hawthorn Woods, IL (US)

(73) Assignee: Canon Medical Systems Corporation, Tochigi (JP)

( * ) Notice: Subject to any disclaimer, the term of this patent is extended or adjusted under 35 U.S.C. 154(b) by 183 days.

(21) Appl. No.: 16/252,392

(22) Filed: Jan. 18, 2019

(65) Prior Publication Data
US 2020/0234471 A1     Jul. 23, 2020

(51) Int. Cl.
*G06T 11/00*     (2006.01)
*G06T 7/11*     (2017.01)

(52) U.S. Cl.
CPC .............. *G06T 11/005* (2013.01); *G06T 7/11* (2017.01); *G06T 2207/10081* (2013.01);
(Continued)

(58) Field of Classification Search
CPC .................... G06T 11/005; G06T 7/11; G06T 2207/10081; G06T 2207/20081;
(Continued)

(56) References Cited

U.S. PATENT DOCUMENTS 6,256,367 B1    7/2001   Vartanian
2004/0264627 A1   12/2004   Besson
(Continued)

FOREIGN PATENT DOCUMENTS

JP       2018-8061 A     1/2018

OTHER PUBLICATIONS

Extended European Search Report dated Mar. 23, 2020 in Patent Application No. 19216168.5, 7 pages.
(Continued)

*Primary Examiner* — Marcos L Torres
(74) *Attorney, Agent, or Firm* — Oblon, McClelland, Maier & Neustadt, L.L.P.

(57) ABSTRACT

A method and apparatus are provided for using a neural network to estimate scatter in X-ray projection images and then correct for the X-ray scatter. For example, the neural network is a three-dimensional convolutional neural network 3D-CNN to which are applied projection images, at a given view, for respective energy bins and/or material components. The projection images can be obtained by material decomposing spectral projection data, or by segmenting a reconstructed CT image into material-component images, which are then forward projected to generate energy-resolved material-component projections. The result generated by the 3D-CNN is an estimated scatter flux. To train the 3D-CNN, the target scatter flux in the training data can be simulated using a radiative transfer equation method.

20 Claims, 18 Drawing Sheets

(52) U.S. Cl.
CPC .............. *G06T 2207/20081* (2013.01); *G06T 2207/20084* (2013.01); *G06T 2211/40* (2013.01)

(58) Field of Classification Search
CPC ....... G06T 2207/20084; G06T 2211/40; G06T 2211/408
See application file for complete search history.

(56) References Cited

U.S. PATENT DOCUMENTS

| | | | |
|---|---|---|---|
| 2018/0014806 A1 | 1/2018 | Lu et al. | |
| 2018/0061058 A1 | 3/2018 | Xu et al. | |
| 2018/0116620 A1 | 5/2018 | Chen et al. | |
| 2018/0330233 A1 | 11/2018 | Rui et al. | |
| 2019/0108441 A1* | 4/2019 | Thibault | G01N 23/046 |
| 2020/0234471 A1* | 7/2020 | Lu | G06T 11/005 |
| 2020/0237319 A1* | 7/2020 | Yi | G06T 11/005 |

OTHER PUBLICATIONS

Shiyu Xu, et al., "Deep Residual Learning in CT Physics: Scatter Correction for Spectral CT", 2017 IEEE Nuclear Science Symposium and Medical Imaging Conference, Oct. 21, 2017, pp. 1-3.
Rührnschopf, Ernst-Peter, et al., "A general framework and review of scatter correction methods in x-ray cone-beam computerized tomography. Part 1: Scatter compensation approaches." Medical physics 38.7 (2011): 4296-4311.
Rührnschopf, Ernst-Peter, et al., "A general framework and review of scatter correction methods in cone beam CT. Part 2: Scatter estimation approaches." Medical physics 38.9 (2011): 5186-5199.
Sun, M., et al., "Improved scatter correction using adaptive scatter kernel superposition." Physics in medicine and biology 55.22 (2010): 6695.
Zou, Yu, et al. "A physics-based fast approach to scatter correction for large cone angle computed tomographic systems." Nuclear Science Symposium and Medical Imaging Conference (NSS/MIC), 2011 IEEE. IEEE, 2011.
Zbijewski, Wojciech, et al., "Efficient Monte Carlo based scatter artifact reduction in cone-beam micro-CT." IEEE transactions on medical imaging 25.7 (2006): 817-827.
Sun, Mingshan, et al. "Rapid scatter estimation for CBCT using the Boltzmann transport equation." SPIE Medical Imaging. International Society for Optics and Photonics, 2014.
Baer, Matthias, et al., "Hybrid scatter correction for CT imaging." Physics in medicine and biology 57.21 (2012): 6849.
Shi, Linxi, et al. "Library based x-ray scatter correction for dedicated cone beam breast CT." Medical Physics 43.8 (2016): 4529-4544.
Satoshi Kida, et al., "Cone Beam Computed Tomography Image Quality Improvement Using a Deep Convolutional Neural Network", Cureus 10(4),: e2548, DOI 10.7759/cureus.2548.

* cited by examiner

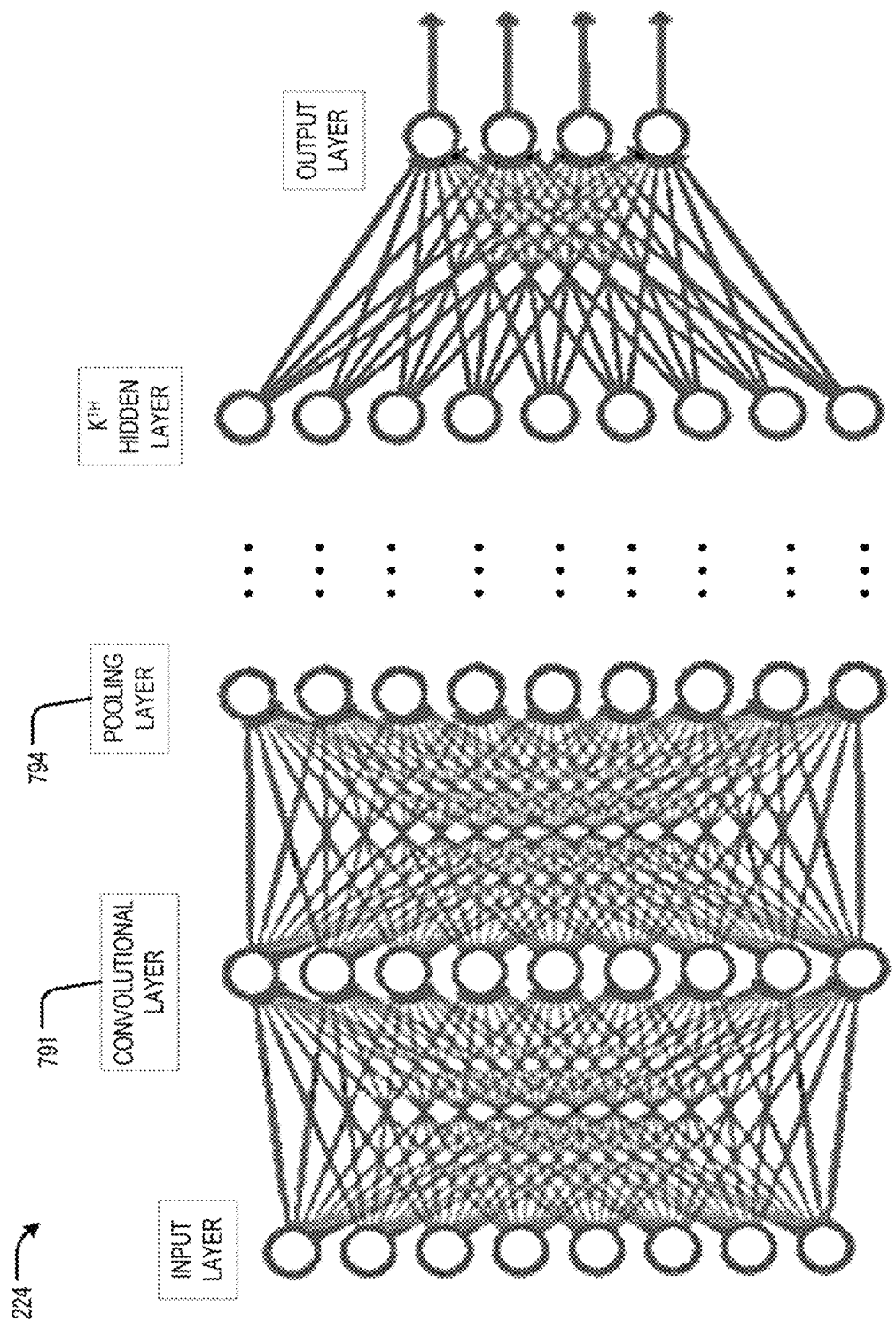

DEEP-LEARNING-BASED SCATTER ESTIMATION AND CORRECTION FOR X-RAY PROJECTION DATA AND COMPUTER TOMOGRAPHY (CT)

BACKGROUND

Field of the Disclosure

The present disclosure relates to machine learning and artificial neural networks for scatter estimation and correction of spectrally resolved X-ray projection data/images. This scatter estimation and correction can find application in computed tomography (CT), X-ray imaging, radiography, fluoroscopy, and angiography, for example.

Description of the Related Art

In computed tomography (CT), X-ray scatter can degrade the quality of reconstructed images. Accordingly, correction and removal of the X-ray scatter is desired. For example, this can be achieved by using various techniques to estimate the X-ray scatter in a given reconstructed image. Then, the estimated scatter can be used to scatter from the CT projection data to obtain the projection signal of the primary beam without X-ray scatter. Monte Carlo and other methods can be used to estimate the X-ray scatter, but these tend to be slow and computationally intensive. Therefore, improved methods that can quickly simulate X-ray scatter without significantly sacrificing accuracy are desired.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8B is an example of a convolutional neural network, according to an embodiment of the present disclosure;

DETAILED DESCRIPTION

Figure 1:
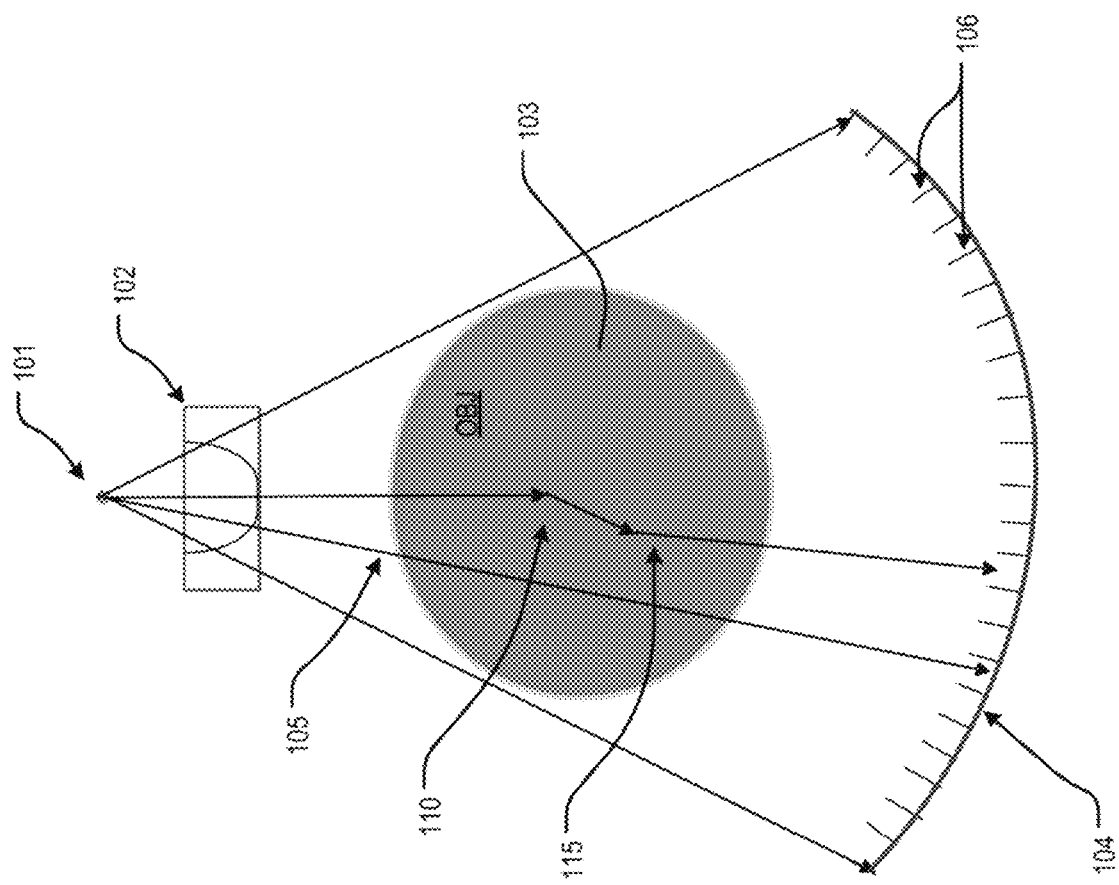
FIG. 1 is a diagram of X-ray scatter in a computed tomography scanner having an anti-scatter grid, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Currently, there are two broad approaches to scatter correction—hardware-based approaches and software-based approaches. Compared to hardware-based approaches, software-based approaches can increase the acquisition of primary signal and reduce the cost of the scanner.

Previous software-based approaches also have their shortcomings. On the one hand, the performance of kernel-based conventional method (e.g., the double-Gaussian kernel method) is insufficient in some cases (e.g., these cases include objects with high scatter primary ratio (SPR), complex shapes, complex combination of materials, etc.). On the other hand, model-based approaches, such as Monte Carlo methods and radiative transfer equation (RTE) methods, can achieve better performance than kernel methods, but this improvement in accuracy/precision comes at the expense of increased computational complexity and time, impeding their practical application in commercial scanner.

The methods described herein overcome both the computational complexity of model-based approaches and the accuracy limitations of the kernel-based approaches by training a neural network to estimate X-ray scatter. Related approaches have also tried to overcome the computational complexity of model-based approaches and achieve high-speed scatter correction using a modified model-based approach. For example, open parameters in traditional kernel methods can be fitted with Monte Carlo method. Unfortunately, due to the scatter complexity in patients, these related approaches fail to accurately estimate scattering for large detectors. Therefore, a fast-speed, high-accuracy scatter correction approach has yet to be developed.

As described above, scattered X-rays in computed tomography (CT) pose a hurdle to the rapid and accurate generation of high-quality (e.g., scatter-free) reconstructed images. Inefficient scatter simulation and compensation can affect image quality, resulting in poor image contrast, artifacts, and other errors in CT image reconstruction. For example, in the context of cone-beam CT with a-wide beam geometry, scatter correction can become even more important for reconstructing high-quality images. To correct for X-ray scatter in the total flux and isolate the primary flux, the measured projection data (i.e., the total flux) can be used to first estimate the scatter flux, and then the estimated scatter flux can be removed from the total flux, leaving the primary flux.

To this end, an X-ray beam, in the presence of a scattering object, can be modeled as a summation of a primary X-ray beam, P(x, y) representing the attenuated X-rays, and a scattered X-ray beam, S(x, y), wherein projection data, T(x, y), is the composite of the two:

$$T(x,y)=P(x,y)+S(x,y).$$

For CT, improved image quality can be achieved by performing image reconstruction using the primary beam P(x, y), which can be estimated, for example, by using the projection data T(x, y) to estimate the scatter beam S(x, y), and then removing the estimated scatter beam S(x, y) from the projection data T(x, y) to isolate the primary beam P(x, y). The isolated primary beam, P(x, y), rather than the total projection data T(x, y), can then be used for tomographic reconstruction, thereby avoiding the imaging artifacts arising from the scatter S(x, y).

In solving for and correcting for the scatter S(x, y), two approaches can be used. First, kernel-based methods use a convolution between a kernel and an image to simulate scatter. For example, a primary beam can be obtained through convolution of T(x, y) with a kernel $K_S(x, y)$. Second, model-based methods rely on a spatial model of a scattering object to compute the scatter as a function of position within the scattering object. As discussed below, the measured projection data can be corrected by subtracting or dividing by the simulated scatter, leaving the primary beam for CT reconstruction of an image.

Where convolution-based approaches fall short, model-based approaches for scatter simulation show promise. Scatter correction with precise simulation of the scatter process using e.g., Monte Carlo methods can reduce errors in corrected CT projection data to mitigate artifacts in images reconstructed from the CT projection data. Monte Carlo methods, however, are challenging to apply to practical scatter correction because they require significant computational resources and time. Monte Carlo methods can be accelerated by reducing simulated photon number and fitting the simulated data. Even so, Monte Carlo simulations are subject to significant noise because they are by nature discrete rather than continuous, and this noise can negatively impact the scatter correction.

Model-based scatter simulations using a deterministic radiative transfer equation (RTE), alternatively, can provide a noise-free solution with expedited simulation speed for scatter compensation. While capable of being performed quickly using GPU acceleration, much like Monte Carlo simulations, discrete ordinate implementations using the RTE can cause a ray effect that, like the noise of Monte Carlo methods, negatively impacts the precision of the simulation. Furthermore, in current many-core processors, a memory bandwidth bottleneck can limit the acceleration of the simulation achievable via parallelization. For example, the acceleration can be limited when RTE is simulated using a finite-element discrete ordinate method with an explicit matrix with a very large dimension. While an integral spherical harmonics implementation for RTE scatter simulation can be used to address the above described speed limitations, the feasibility of scatter simulations for routine clinical applications remains minimal, encumbered by computational demands and speed.

Machine learning approaches, and deep learning in particular, are poised to achieve improvements in medical imaging. For example, machine learning approaches can be used for diagnostics. So far, however, there has been little success at employing machine learning approaches for image reconstruction, including scatter estimation as a component thereof. A new approach, therefore, is needed in order to expand the use of machine learning approaches to scatter estimation and image reconstruction, thus improving scatter estimation runtime speed and reducing runtime computational costs.

Accordingly, without sacrificing precision or increasing noise, the methods described herein provide machine learning-based scatter estimations for scatter correction that exploit the accuracy of model-based approaches. According to an embodiment, the machine learning-based approach can include a neural network trained to minimize a loss function between a scatter estimation result from the neural network and a target value representing ground truth for the X-ray scatter. For example, in certain implementations, the ground truth can be generated using a scatter simulations produced via an RTE-based approach that applies spherical harmonic expansion in the integrand of the RTE integral equation to simplify and accelerate the calculations.

In certain implementations of the RTE-based approach, the first-order scatter can be simulated as $$\psi_1(\vec{r}, E, \hat{\Omega}) = \int_{\vec{r}_c}^{\vec{r}} d\vec{r}'$$
$$\int\int d\hat{\Omega}' dE' f(\vec{r}', E, E', \hat{\Omega} \cdot \hat{\Omega}')\psi_0(\vec{r}', E', \hat{\Omega}')\exp\left[-\int_{\vec{r}'}^{\vec{r}} d\vec{r}'' \mu(\vec{r}'', E)\right],$$

wherein the subscript 1 in $\psi_1(\vec{r}, E, \hat{\Omega})$ indicates the first-order scatter at point $\vec{r}$, E is an energy, and $\hat{\Omega}$ is a unit vector in the direction of propagation for the X-ray flux and the subscript 0 in $\psi_0(\vec{r}', E', \hat{\Omega}')$ indicates the zero-order scatter (i.e., the X-ray beam in the absence of scatter). Further, the vector $\vec{r}_c$ indicates a starting point for an X-ray path, and $f(\vec{r}', E, E', \hat{\Omega}\cdot\hat{\Omega}')$ is the scatter cross section, which includes both Compton and Rayleigh scattering for X-ray CT. Finally, the variable $\mu(\vec{r}, E)$ represents the total attenuation coefficient for the X-rays at point $\vec{r}$ and energy E. This integral equation can be solved by discretizing the coordinates $\vec{r}$, E, $\hat{\Omega}$, $\vec{r}'$, E', $\hat{\Omega}'$, and $\vec{r}''$, and then solving numerically.

In addition to first-order scatter $\psi_1(\vec{r}, E, \hat{\Omega})$, the multiple scatter $\psi_s(\vec{r}, E, \hat{\Omega})$ can include higher-order scatter. For example, the multiple scatter can be iteratively calculated as $$\psi_s^{k+1}(\vec{r}, E, \hat{\Omega}) =$$
$$\psi_1(\vec{r}, E, \hat{\Omega}) + \int_{\vec{r}_c}^{\vec{r}} d\vec{r}' \int\int d\hat{\Omega}' dE' f(\vec{r}', E, E', \hat{\Omega}\cdot\hat{\Omega}') \psi_s^k(\vec{r}', E', \hat{\Omega}')$$
$$\exp\left[-\int_{\vec{r}'}^{\vec{r}} d\vec{r}'' \mu(\vec{r}'', E)\right],$$

wherein the first term on the right-hand side is the first-order scatter and the second term on the right-hand side (i.e., the integral) represents higher-order scatter.

The scattered X-ray field at the detectors, which are located at position $\vec{r}_D$, can be expressed as $$\psi_s(\vec{r}_D, E, \hat{\Omega}) =$$
$$\int_{\vec{r}_c}^{\vec{r}_D} d\vec{r}' \int\int d\hat{\Omega}' dE' f(\vec{r}', E, E', \hat{\Omega}\cdot\hat{\Omega}')[\psi_s(\vec{r}', E', \hat{\Omega}') + \psi_0(\vec{r}', E', \hat{\Omega}')]$$
$$\exp\left[-\int_{\vec{r}'}^{\vec{r}_D} d\vec{r}'' \mu(\vec{r}'', E)\right].$$

Accordingly, scatter can be accurately simulated by including both the first-scatter flux and the multiple-scatter flux in order to represent an accurate physical model.

In certain implementations, the scatter cross section terms $f(\vec{r}', E, E', \hat{\Omega}\cdot\hat{\Omega}')$ and the X-ray flux terms $\psi_s(\vec{r}', E', \hat{\Omega}')$ and $\psi_0(\vec{r}', E', \hat{\Omega}')$ in the integrand can be expanded and expressed using the lowest-order spherical harmonics terms in series expansion, simplifying the calculations. For example, the first-scatter flux can be calculated by a discretized integral formula, which is given by $$\psi_1(\vec{r}, E, l, m) = \int\int\int d^3\vec{r}' \exp\left[-\int_{\vec{r}'}^{\vec{r}} d\vec{r}'' \mu(\vec{r}'', E')\right] \frac{1}{|\vec{r}-\vec{r}'|^2} Y_{lm}^*(\hat{\Omega}) \times$$
$$\int dE' f(\vec{r}, E, E', \hat{\Omega}\cdot\hat{\Omega}') \psi_c(\vec{r}_c, E', \hat{\Omega}') \exp\left[-\int_{\vec{r}_c}^{\vec{r}'} d\vec{r}'' \mu(\vec{r}'', E')\right]$$

wherein $Y^*_{lm}(\hat{\Omega})$ is the complex conjugation of a spherical harmonic function of degree l and order m, and $\psi_1(\vec{r}, E, l, m)$ is the intensity of the first-scatter flux in the spherical-harmonics domain. The spherical harmonics can be given by $$Y_{lm}(\hat{\Omega}) = Y_{lm}(\theta,\phi) = N \exp(im\phi) P_l^m(\cos(\theta)),$$

wherein $Y_{lm}(\hat{\Omega})$ is a spherical harmonic function of degree l and order m, $P_l^m$ is an associated Legendre polynomial, N is a normalization constant, and θ and φ represent colatitude and longitude, respectively. The number of spherical harmonics used to approximate the first-scatter flux can depend on the material component and scatter cross-section at the point $\vec{r}'$ and on the type of scattering (e.g., Compton and Rayleigh scattering).

Further, the flux of multiple scatters can be calculated using a discretized integral spherical harmonics formula, which is given by $$\psi_s^{k+1}(\vec{r}, E, l, m) = \psi_1(\vec{r}, E, l, m) + \quad (2)$$
$$\int\int\int d^3\vec{r}' \exp\left[-\int_{\vec{r}'}^{\vec{r}} d\vec{r}'' \mu(\vec{r}'', E')\right] \frac{1}{|\vec{r}-\vec{r}'|^2} Y_{lm}^*(\hat{\Omega}) \times$$
$$\sum_{E'}\sum_{\bar{l}} f(\vec{r}', E, E', \bar{l}) \sum_{\bar{m}} Y_{lm}(\hat{\Omega}) \psi_s^k(\vec{r}', E', \bar{l}, \bar{m}),$$

wherein $\psi_s^{k+1}(\vec{r}, E, l, m)$ and $\psi_s^k(\vec{r}', E', \bar{l}, \bar{m})$ are the intensity of the flux for multiple scatter including all scatter events up to order k+1 and order k respectively and $f(\vec{r}', E, E', \bar{l})$ is the $\bar{l}$-th coefficient when the scatter cross-section is expanded using the Legendre polynomials. By defining $$A = \int\int\int d^3\vec{r}' \exp\left[-\int_{\vec{r}'}^{\vec{r}} d\vec{r}'' \mu(\vec{r}'', E')\right]$$
$$\frac{1}{|\vec{r}-\vec{r}'|^2} Y_{lm}^*(\hat{\Omega}) \times \sum_{E'}\sum_{\bar{l}} f(\vec{r}', E, E', \bar{l}) \sum_{\bar{m}} Y_{lm}(\hat{\Omega}),$$

the above-defined iterative formula can be more simply expressed as $$\psi_s^{k+1} = A\psi_s^k + \psi_1.$$

Referring to the drawings, FIG. 1 shows a diagram of the scatter process in which a primary flux 105 is transmitted, with attenuation, through an object OBJ and detected at a plurality of detectors 104. In an embodiment, the object OBJ can be a phantom 103, or in clinical applications, the object OBJ can be a patient. The CT system can include an X-ray source 101, a bowtie filter 102, and the plurality of detectors 104 configured with an anti-scatter grid 106. The primary flux 105 includes X-rays that are not scattered. In addition to the primary flux 105, the detectors 104 also detect first-scatter flux 110, which includes X-rays that have undergone a single scattering event. Further, the plurality of detectors 104 also detect multi-scatter flux 115 (otherwise referred to as multiple-scatter flux), which includes X-rays that have been scattered multiple times. That is, the detectors detect total flux T(u, v), which includes both the primary P(u, v) and scatter S(u, v) flux.

In kernel-based methods, the scatter S(u, v) is estimated through convolution with $K_s(u, v)$:

$$S(u,v) \approx T(u,v) \otimes K_s(u,v)$$

wherein, the symbol '⊗' denotes the convolution operator. Due to the two-dimensional (2D) nature of kernel-based methods, this use of the convolution to model scatter is limited with regards to estimating more complicated scattering signal, especially when the large detector is being used. For example, it may be difficult to use kernel-based methods to accurately perform a scatter correction for a different sequence of complex shapes or for a highly-attenuated sinogram like a shoulder image.

To overcome the accuracy limitations of kernel-based methods, the methods described herein train and use a three-dimensional (3D) convolutional neural network (CNN) for estimation and correction of X-ray scatter in CT projection data. Advantageously, the 3D CNN can be more accurate than the above-described kernel-based methods with operational speeds surpassing the above-described model-based methods.

Figure 2A:
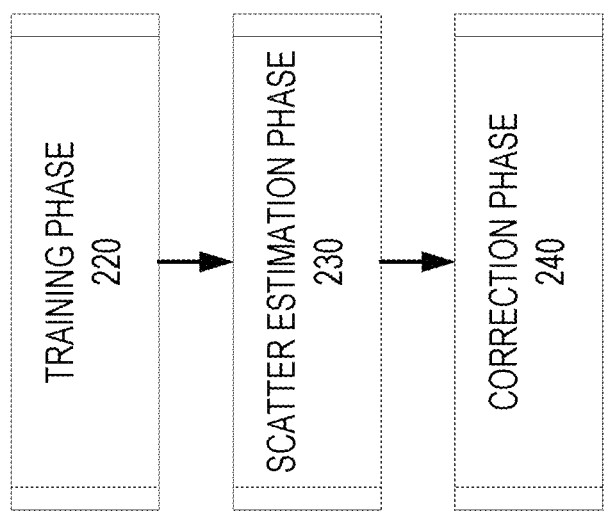
FIG. 2A is a high-level flowchart of a method of scatter estimation and correction, according to an exemplary embodiment of the present disclosure.

FIG. 2A provides a high-level framework for a training a 3D CNN for scatter estimation. The 3D CNN is trained using a training dataset generated from a model-based scatter estimation method. In a training phase, at process 220, a training dataset can be generated using as ground truth scatter profiles, and the ground truth scatter profiles can be generated from a model-based scatter estimation method. This training dataset can then be used to train the neural network. In a scatter estimation phase, at process 230, projection/sinogram data from a CT scan can be processed and then applied to the trained neural network with the result from the neural network being an estimate of the X-ray scatter flux. Subsequently, in a correction phase of process 240, scatter correction can be performed to remove the X-ray scatter flux from the projection data, and an image can then be reconstructed from the corrected projection data. The final reconstructed image represents the attenuation of the primary X-ray beam without the X-ray scatter flux.

Figure 2B:
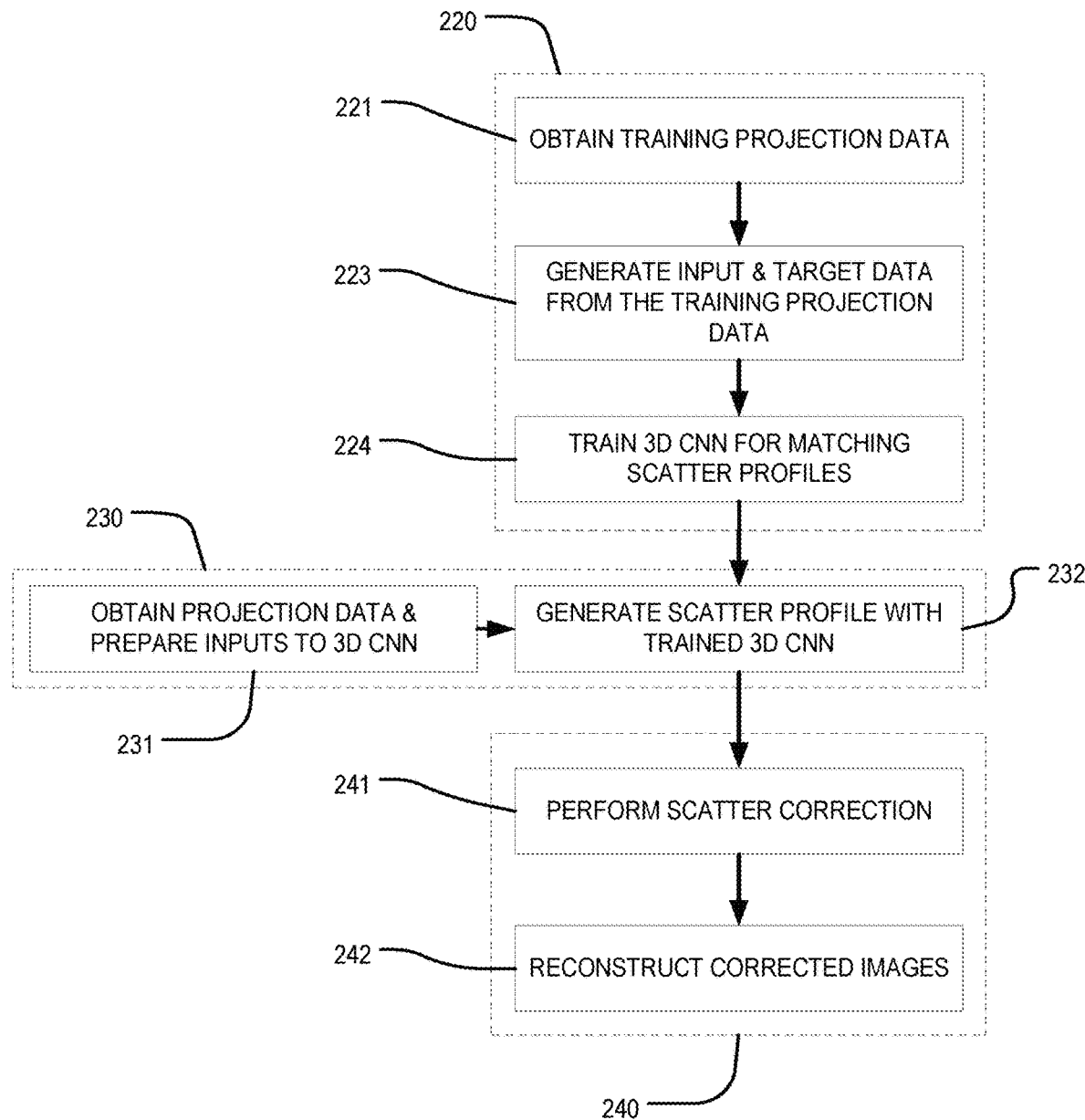
FIG. 2B is a low-level flowchart of a method of scatter estimation and correction, according to an exemplary embodiment of the present disclosure.

FIG. 2B provides a low-level flow diagram for the scatter estimation and correction method.

In step 221 of process 220, a training projection data can be acquired. A large training projection database, which includes a plurality of training projection dataset, can be used to account for the several factors upon which X-ray scatter can depend, including: CT system geometry, the source energy spectrum, and the size and organ distribution of patients. To this end and according to an embodiment, a training projection database can include a plurality of phantom training projection data and a plurality of patient training projection data. Each phantom of the plurality of phantom training projection data can be selected according to a pre-determined human anatomy through modulation of the shape, size, and material each phantom is constructed from. In addition, and in consideration of a representative population of patients, the plurality of patient training projection data can be selected to include patients of simple and complex anatomy, the data including typical patent data with variations including, among others, organ distribution, size, metal inclusion, and contrast. Further, the projection datasets can be spectral resolved projection data in which projection images is acquired for respective energy bins covering separate ranges of the X-ray energy. The X-ray energy bins present in each training projection dataset can include specific portions of a spectra (e.g., 20-60 keV, 60-80 keV, 80-100 keV, and 100-120 keV). In other implementations, the training sinograms can correspond to projection data obtained using energy-integrating detectors, as opposed to, for example, spectrally-resolving photon counting detectors.

In step 223 of process 220, the training data for training the 3D CNN is generated from the training projection data. To train a neural network the training data includes input data paired with target data, such that when the neural network is trained applying the input data to the neural network generates a result that matches the target data as closely as possible. To this end, the input data to the 3D CNN is spectrally-binned projection data including X-ray scatter flux that has been decomposed/segmented into material components (e.g., bone and water). Further, the target data to the 3D CNN are estimates of the scatter flux.

In certain implementations, the input data of the training data are generated by reconstructing CT images from the training projection data, and then forward projecting the reconstructed CT images to generate projection data without scatter flux. The scatter flux can be generated from the reconstructed CT images using a model-based method, and then combined with the projection data without scatter flux to obtain the total X-ray flux with both the primary flux and the scatter flux. Further, this total scatter flux can be separated according to material component and spectral bin to generate the input data of the training data, as shown in FIG. 3E. The target data can be given by the scatter flux that was generated using the model-based method.

The CT image corresponding to the training projection data can be reconstructed according to techniques known to one of ordinary skill in the art. Further, the reconstructed images can be segmented in the image domain to generate material-component images. For example a threshold can be applied based on the radiodensity of voxel values in the image domain (e.g., using a threshold and region growing method) to determine that voxels with a radiodensity above the threshold correspond to a bone material component and that voxels with a radiodensity below the threshold but above an air threshold correspond to a water material component, as shown in FIG. 3C. Alternatively, for spectral CT, material decomposition can be performed in either the projection domain or the image domain to separate the attenuation values (e.g., projection lengths in the projection domain) into material components. After generating material-component images, a forward projection can be performed on these material-component images to generate material-component projections, as shown in FIG. 3D. These material-component projections can be performed numerically using a forward-projection operator, and, therefore, the material-component projections are free of the X-ray scatter present in measured projection data.

Using the material-component images to generate a model of the X-ray scatter, a model-based scatter estimation method can be used to generate scatter profiles corresponding to each of the material-component projections. These scatter profiles then serve as the target images/data for training the 3D CNN and the combination of the scatter profiles together with the material-component projections provides the input images/data for training the 3D CNN.

For example, in certain implementations, reference scatter profiles provide the target images/data (e.g., a ground truth scatter profile), and these scatter profiles can be acquired via techniques understood by one of ordinary skill in the art. In certain implementations, the reference scatter profiles are acquired via a model-based method including, among others, an RTE method, thereby providing improved speed (as compared to Monte Carlo method) while maintaining accuracy and being free of noise.

A single pair of material-component images can be used to generate many sets of material-component projections, wherein each set of material-component projections corresponds to a particular view (i.e., projection angle). This is achieved by calculating respective forward projections at a series of views (i.e., projection angles). When the difference between views is very small, the projections and scatter estimation at the respective review are largely redundant. Accordingly, the use of sparse views is preferred for generating the material-component projections and reference scatter profiles used in the training data.

At step 224, the training data, including the target images paired with respective sets of input images, are used for training and optimization of a 3D CNN. Generally, training of the 3D CNN may proceed according to techniques understood by one of ordinary skill in the art, and the training of the 3D CNN is not limited to the specific examples provided herein, which are provide as non-limiting example to illustrate some ways in which the training can be performed.

Following training of the 3D CNN in the training phase of process 220, a generation phase of process 230 can be performed.

First, in step 231 of process 230, projection data from a CT scan can be acquired and prepared for application to the trained 3D CNN. For example, spectral projection data can be separated into material components. The prepared projection data will be segmented into components having a same structure as the input images/data in the training data. For example, as shown in FIG. 3E, the prepared projection data can be separated into eight projections: four bone projections corresponding to following energy bins {20 keV,60 keV}, {60 keV,80 keV}, {80 keV,100 keV}, and {100 keV,120 keV}; and four water projections corresponding to the same energy bins. The process of preparing the projection data can include any one or more of the methods described above for preparing the input images/data of the training data, or any other methods.

Next, in step 232 of process 230, the prepared projection data are applied to the trained 3D CNN and a scatter profile is generated therefrom. The generated scatter profile output from the trained 3D CNN, and then, at process 240, the resulting scatter profile can be used to correct the projection data.

In step 241 of process 240, the output from the trained 3D CNN can be used to correct the projection data obtained at step 231 by removing the scattering flux. That is, by eliminating the scatter from the uncorrected images, the primary beam can be isolated.

Next, at step 242 of process 240, the isolated primary beam can be used to reconstruct a CT image that is the corrected image.

Returning to step 241, scatter correction can be performed using either a multiplicative method or an additive method. In both the multiplicative and additive methods, the scatter profile resulting from the trained 3D CNN can be represented as $\varphi_S$, $(r_D, vi)$, wherein $r_D$ is the spatial coordinate of the pixels in the projection data and vi is an index of the view (e.g., the projection angle of the CT scanner at which the projection data is acquired).

First, considering the multiplicative method, for each view, the primary flux $\varphi_P(r_D, vi)$ using the ratio of the scatter to the total flux (STR), i.e., $$STR(r_D, vi) = \frac{\varphi_S(r_D, vi)}{\varphi_T(r_D, vi)} \approx \frac{\varphi_S(r_D, vi)}{\varphi_S(r_D, vi) + \varphi_P(r_D, vi)},$$

wherein $\Omega_T(r_D, vi)$ is the simulated total flux and $\varphi_S(r_D, vi)$ is the estimated scatter flux. By rearranging the above expression, it can be observed that the primary flux $\varphi_P(r_D, vi)$ can be estimated from the forward projection. This method of scatter correction is straightforward and robust because there is no negative value generation in the measurements.

Second, the additive method of scatter correction applies a scale factor α between the simulated and measured flux. In order to determine the scale factor α, measured calibration methods before scanning can be used. After α is obtained, the corrected measured total flux $\varphi_{C,M,T}(r_D, vi)$ can be calculated by $$\varphi_{C,M,T}(r_D,vi) = \varphi_{M,T}(r_D,vi) - \alpha\varphi_S(r_D,vi).$$

As discussed above in the context of generating training data, the scatter flux changes very little for views taken at closely spaced projection angles. Accordingly, the scatter flux $\varphi_S(r_D, vi)$ can be estimated for sparse views and interpolated to find the scatter flux in between these sparse views.

Regarding the multiplicative method, for each view, the ratio of scatter and total flux $STR(r_D, vi)$ can be given by $$STR(r_D, vi)) = \frac{\varphi_s(r_D, vi)}{\varphi_S(r_D, vi) + \varphi_P(r_D, vi)}.$$

Using the ratio of scatter and total flux $STR(r_D, vi)$, the corrected measured total flux $\varphi_{C,M,T}(r_D,vi)$ can be calculated by $$\varphi_{C,M,T}(r_D,vi) = \varphi_{M,T}(r_D,vi) \times (1 - STR(r_D,vi)),$$

wherein $\varphi_{M,T}(r_D,vi)$ is the measured total flux. The scatter flux $\varphi_S(r_D, vi)$ used above to calculate the ratio of scatter and total flux $STR(r_D, vi)$ can be calculated using the RTE method for all views. Alternatively, the RTE method can be used to calculate the scatter flux $\varphi_S(r_D, vi)$ for sparse views, and then the remaining views can be interpolated from the simulated sparse views. An advantage of this method is that negative values for the corrected measurements are avoided. Accordingly, this method is straightforward and robust.

Figure 2C:
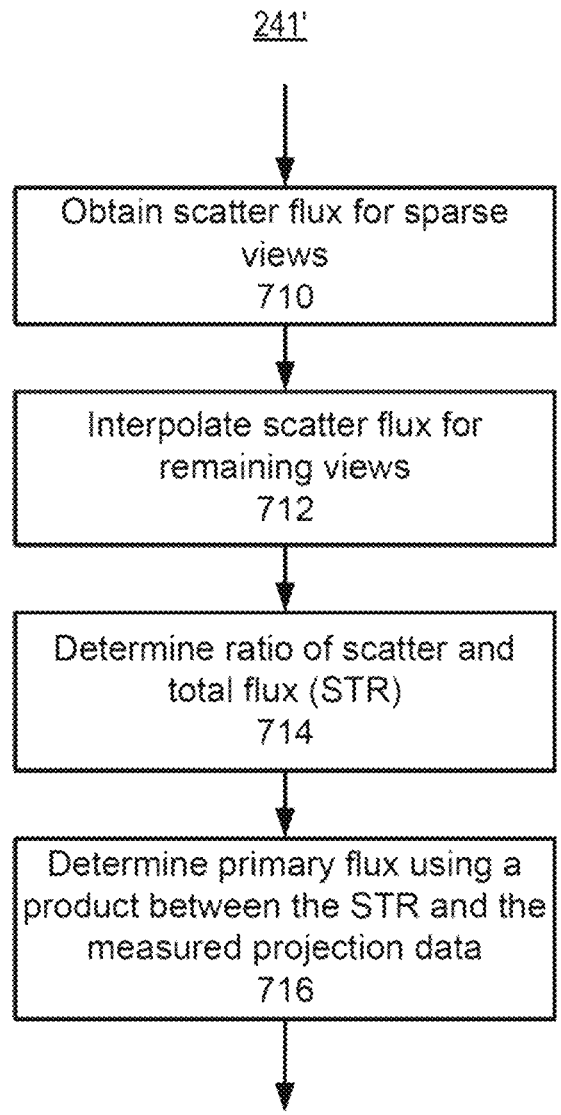
FIG. 2C is a flowchart of an implementation of scatter correction using a multiplicative method, according to an exemplary embodiment of the present disclosure.

FIG. 2C shows a flow diagram of one implementation of step 241 using the multiplicative method 241'. In step 710, scatter flux corresponding to sparse views are obtained. In step 712, scatter flux for the remaining views is interpolated from the sparse-views scatter flux. In step 714, the ratio of scatter and total flux $STR(r_D, vi)$ is calculated. In an alternative implementation, the order of steps 712 and 714 can be reversed and the STR can be calculated for the sparse views and then the STR for all views can be interpolated from the STR over the sparse views. In step 714, the corrected measured total flux $\varphi_{C,M,T}(r_D, vi)$ is calculated as the product between the measured total flux $\varphi_{M,T}(r_D, vi)$ and a function of the ratio of scatter and total flux is $STR(r_D, vi)$.

The additive method has other benefits over the multiplicative method described above. For example, the multiplicative method can disadvantageously change the noise pattern of the measurements, affecting imaging quality when iterative reconstruction is performed using the corrected measured total flux $\varphi_{C,M,T}(r_D, vi)$. In contrast, the additive method does not change the noise pattern. Rather, the additive method uses a scale factor to calibrate the interpolation from the simulated scatter flux. That is, a scale factor α is used between the simulated and measured flux. For example, the scale factor α can be determined empirically using measured calibration methods before the CT scan. After α is obtained, $\Omega_{C,M,T}(r_D,vi)$ can be calculated using the expression given by $$\varphi_{C,M,T}(r_D,vi) = \Omega_{M,T}(r_D,vi) - \alpha\Omega_S(r_D,vi).$$

Like the multiplicative method, the additive method can also use the RTE method to simulate the scatter flux for all views, or to simulate the scatter flux for only sparse views and then interpolate the scatter flux for the remaining views.

Figure 2D:
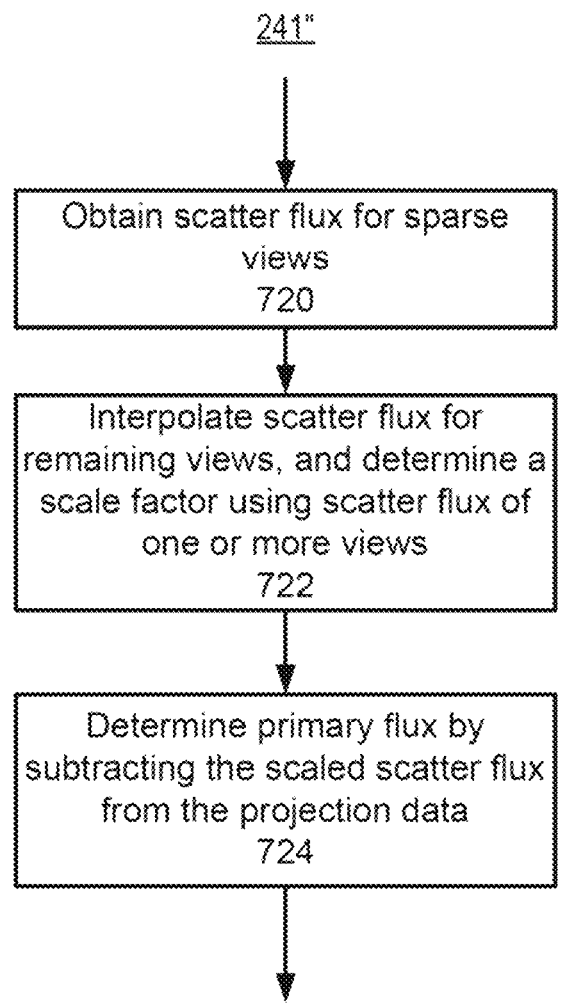
FIG. 2D is a flowchart of an implementation of scatter correction using an additive method, according to an exemplary embodiment of the present disclosure.

FIG. 2D shows a flow diagram of one implementation of step 241 using the additive method 241". In step 720, scatter flux corresponding to sparse views are obtained. In step 722, scatter flux for the remaining views is interpolated from the sparse-views scatter flux. Further in step 722, the scale factor α is determined by comparing the simulated and measured flux. In step 724, the scale factor α is applied to the scatter flux for all views, and after scaling the scatter flux is subtracted from the measured projection data to recover the primary flux.

Figure 3A:
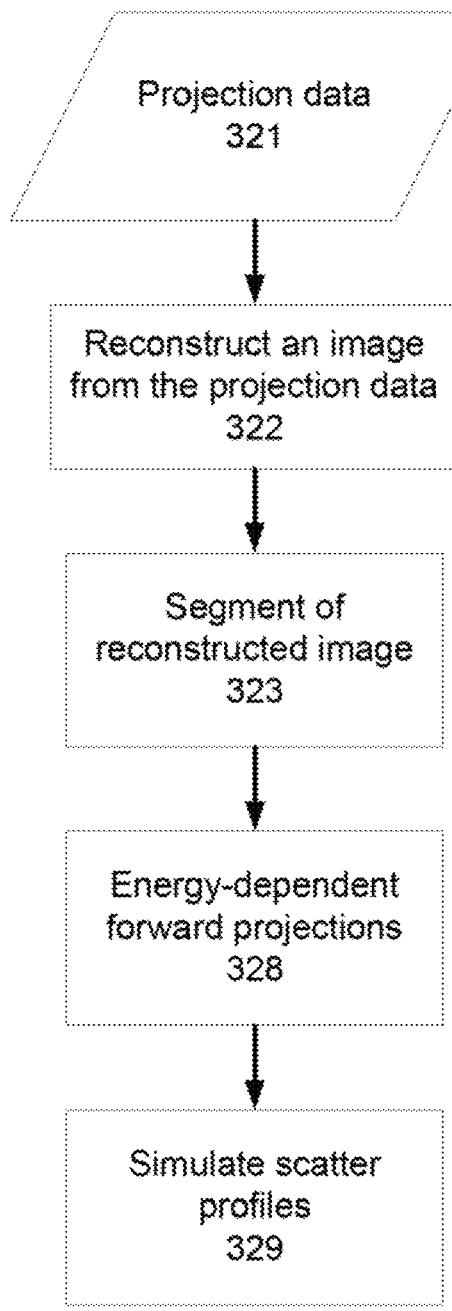
FIG. 3A is a flowchart of an aspect of a training phase of the method of scatter estimation and correction, according to an exemplary embodiment of the present disclosure.

FIG. 3A is a flowchart describing a non-limiting example for implementing step 223. The input into step 223 is the projection data 321. The projection data 321 may include phantom projection data and/or patient projection data, as discussed above. Further, projection data may be from an energy-integrating detector (e.g., not energy resolved) or from a photon counting detector (e.g., energy resolved).

At step 322, a CT image is reconstructed from the projection data.

At step 323, the CT image is segmented into material components. For example, the segmentation can be thresholding based upon radiodensity (e.g., Hounsfield Units).

At step 328, the segmented reconstructed image is forward projected to generate material-component projections. The forward projection can be used to generate, for example, a plurality of energy-dependent forward projection based on known functions of the attenuation as a function of energy for the material components.

At step 329, the scatter profiles are simulated, e.g., using a model-based method such as the RTE method discussed above.

Figure 3B:
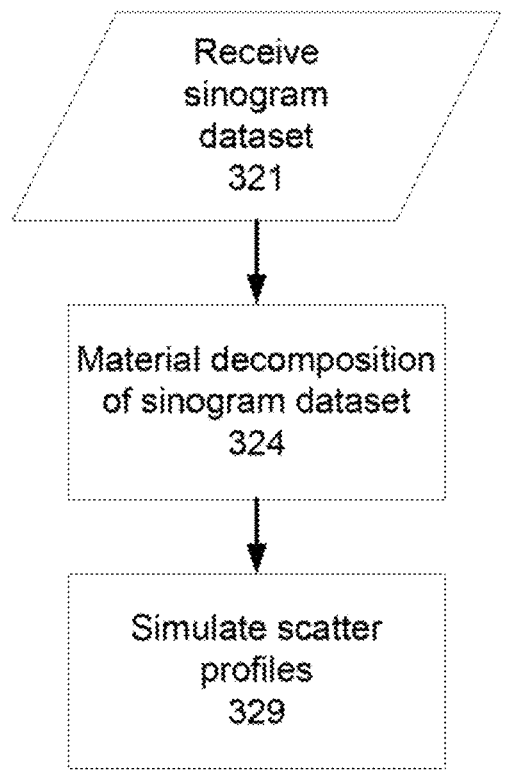
FIG. 3B is a flowchart of an aspect of a training phase of the method of scatter estimation and correction, according to an exemplary embodiment of the present disclosure.
Figure 3C:
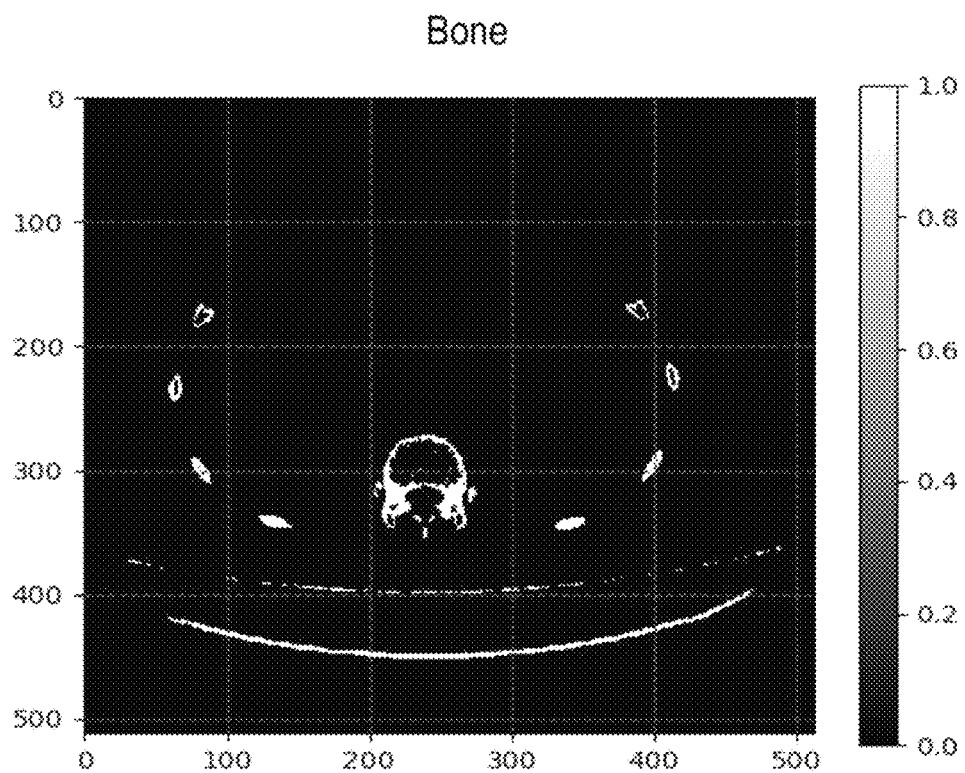
FIG. 3C shows transverse cross-sections of a reconstructed CT image that has been segmented into bone and water material components, according to an exemplary embodiment of the present disclosure.
Figure 3C:
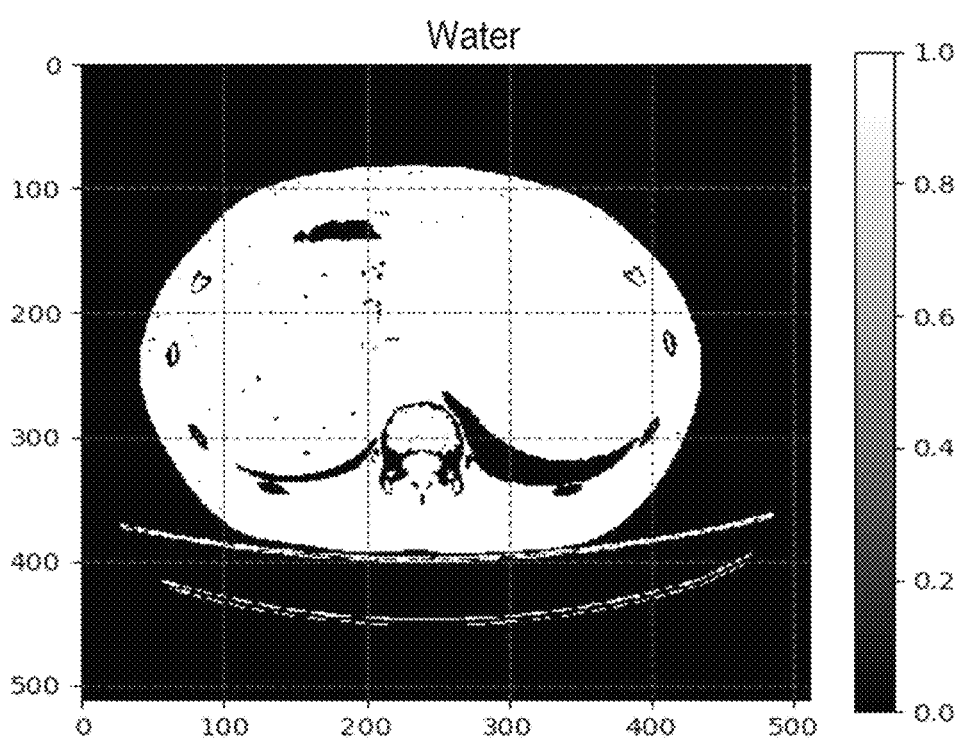
Figure 3D:
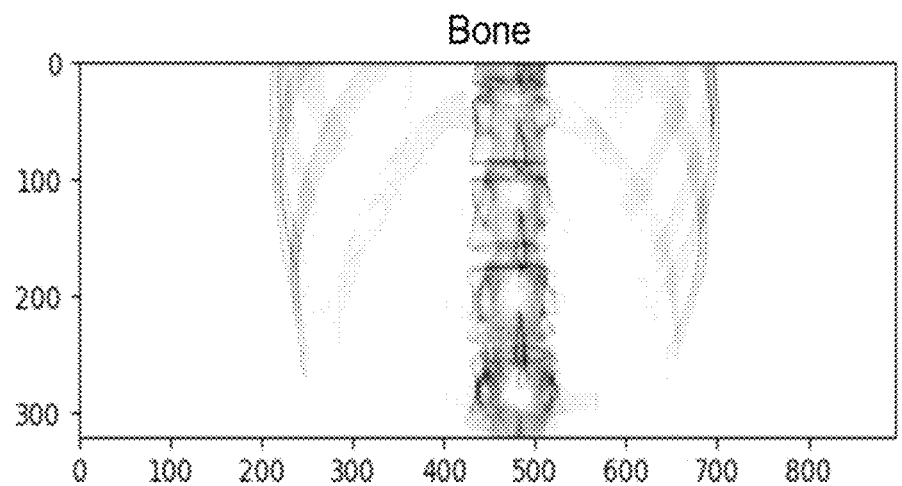
FIG. 3D shows forward projections of the bone and water material components, according to an exemplary embodiment of the present disclosure.
Figure 3D:
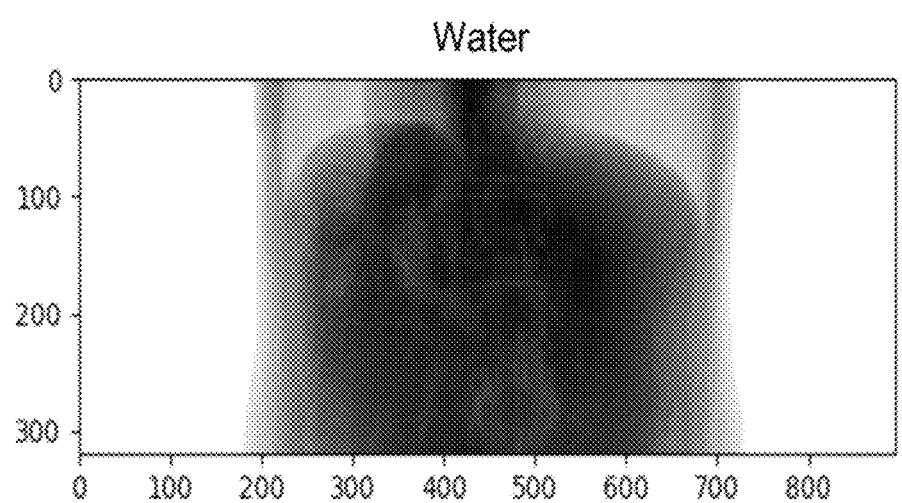
Figure 3E:
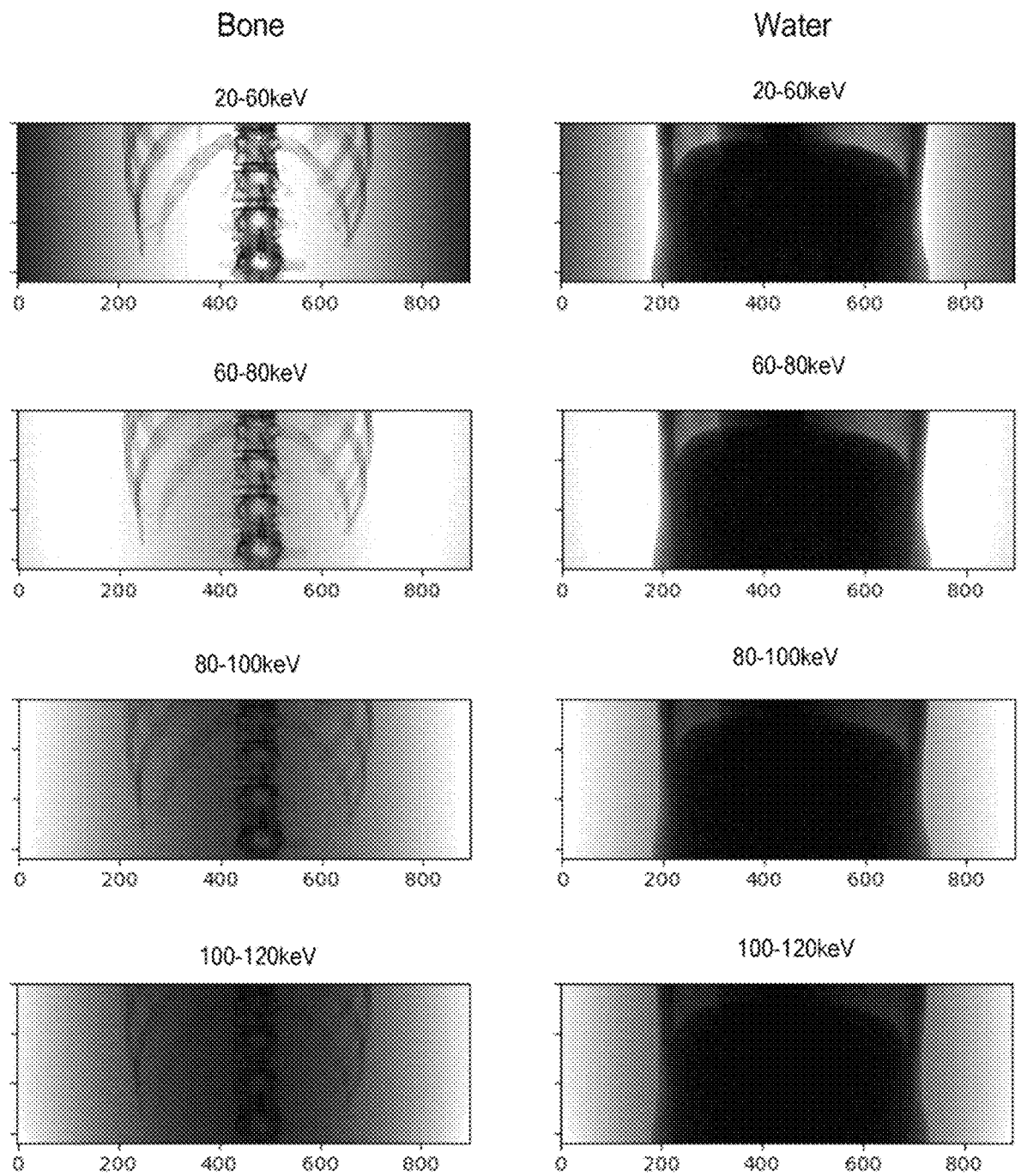
FIG. 3E shows forward projections of the bone and water material components that include simulated scatter and that have been partitioned into energy bins, according to an exemplary embodiment of the present disclosure.

FIG. 3B shows a flowchart of another non-limiting example for implementing step 223. In contrast to the flowchart in FIG. 3A, the flowchart in FIG. 3B uses material decomposition of spectral CT projection data to separate the material components, rather than using a segmentation method to separate the material components.

At step 324, material decomposition is performed on the received training projection data. This material decomposition can be performed to generate projection data corresponding to, for example, bone and water. In addition, the material-component projection data can be separated into respective energy bins based on known functions of the attenuation as a function of energy for the material components.

At step 329, the scatter profiles are simulated, e.g., using a model-based method such as the RTE method discussed above.

FIG. 3C shows an example of material-component CT images resulting from step 323. In this case, the reconstructed image has been separated into a bone-component image and a water-component image.

FIG. 3D shows an example of forward projections of the material-component CT images. In this case, the material-component projections are for a bone-component projection and a water-component projection.

FIG. 3E shows an example of the forward projections segmented according to energy bins and combined with simulated scatter, which was generated using the RTE method.

The 3D CNN receives as an input the eight projections corresponding to a particular view (i.e., projection angle). The 3D CNN performs a three-dimensional convolution in which two of the three dimensions are the two spatial dimensions of the forward projections, and the third dimension is energy (and material component). That is, by stacking the eight projections shown in FIG. 3E according to energy and material component a composite three-dimensional data structure is generated, wherein the dimension in which the projections are stacked is the third dimension. In general, there can be either more or less than eight projections in the composite 3D data structure applied to the 3D CNN. For example, there can be more or less than four energy bins, and there can be more or less than two material components.

Figure 4:
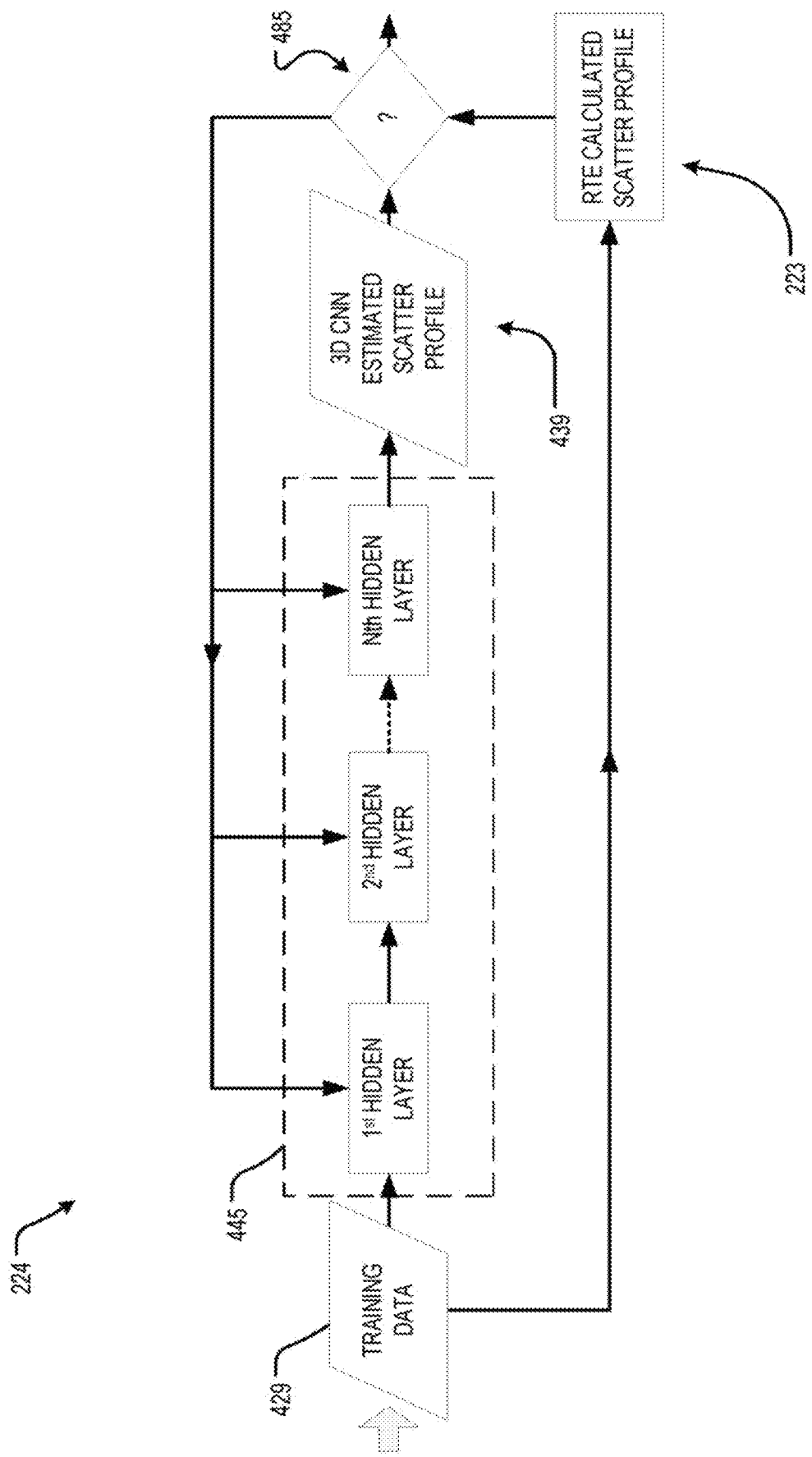
FIG. 4 is a high-level flowchart of an aspect of the training phase of the method of scatter estimation and correction, according to an exemplary embodiment of the present disclosure.

FIG. 4 shows a flowchart of step 224 describing training and optimization of a 3D CNN, according to an exemplary embodiment of the present disclosure. The type of neural network used can vary with application and can include residual networks, convolutional neural networks and encoder/decoder networks, among others. Generally, the 3D CNN receives training data, or, for instance, training images, from different X-ray levels as inputs and outputs a scatter profile that is minimized to a reference scatter profile that may be a model-based reference or a ground-truth profile (generated via model-based approach). Specifically, training the 3D CNN begins with providing the training data from each energy level as an input layer at step 429. The input layer at step 429 can undergo convolution by a filter of a predefined size and activation. In an exemplary embodiment, the convolution filter is a 3D filter and the activation is a rectified linear unit (ReLU). The output of the input layer, or feature map, is then the input of a first hidden layer. At the first hidden layer, the feature map is further modified via, for example, convolution, batch normalization, and activation by ReLU. In an embodiment, the output feature map of the first hidden layer is then the input feature map for a second hidden layer. The second hidden layer can be a pooling layer, for example, downsampling the feature map to improve computational speed. Subsequent n hidden layers of the network can be included, as needed. The output of an $n^{th}$ hidden layer then becomes the input for an output layer at step 439, the output layer at step 439 being a fully connected layer and describing an estimated scatter profile for the training data. The 3D CNN scatter estimation from the output layer at step 439 can then be compared with the concurrently determined scatter estimation from RTE-method, or reference scatter profile, at step 485, and a loss function can be minimized. If, at step 485, it is determined that a criterion is met and the loss function has been minimized, the 3D CNN is sufficiently trained and is ready for implementation with uncorrected data. Alternatively, if it is determined at step 485 that the criterion is not met and the loss function has not been minimized, the process returns to the input layer at step 429 and updates are made to weights/coefficients of the network.

According to an embodiment, as implemented at step 485 of FIG. 4, the loss function can be simply defined by the mean square error between the 3D CNN-estimated scatter ($S_{CNN}$) and RTE-based scatter estimation ($S_{RTE}$). In other words, $$\frac{1}{n}\sum_{i=1}^{n}\|S_{RTE}-S_{CNN}\|^2$$

where n is the number for the training data. In an example, the loss function can be minimized using classic deep learning optimization methods, such as stochastic gradient descent, among others. The above-described loss function will be described with detail in a later section.

Further to the pooling layers of the above-described 3D CNN, computational energy can be conserved through sparse-view training, as scatter change between views are often slow. Therefore, sparse-view training can be used to reduce the training time. Moreover, down-sampling for each view can further reduce the training size, conserving training time and testing time.

Figure 5:
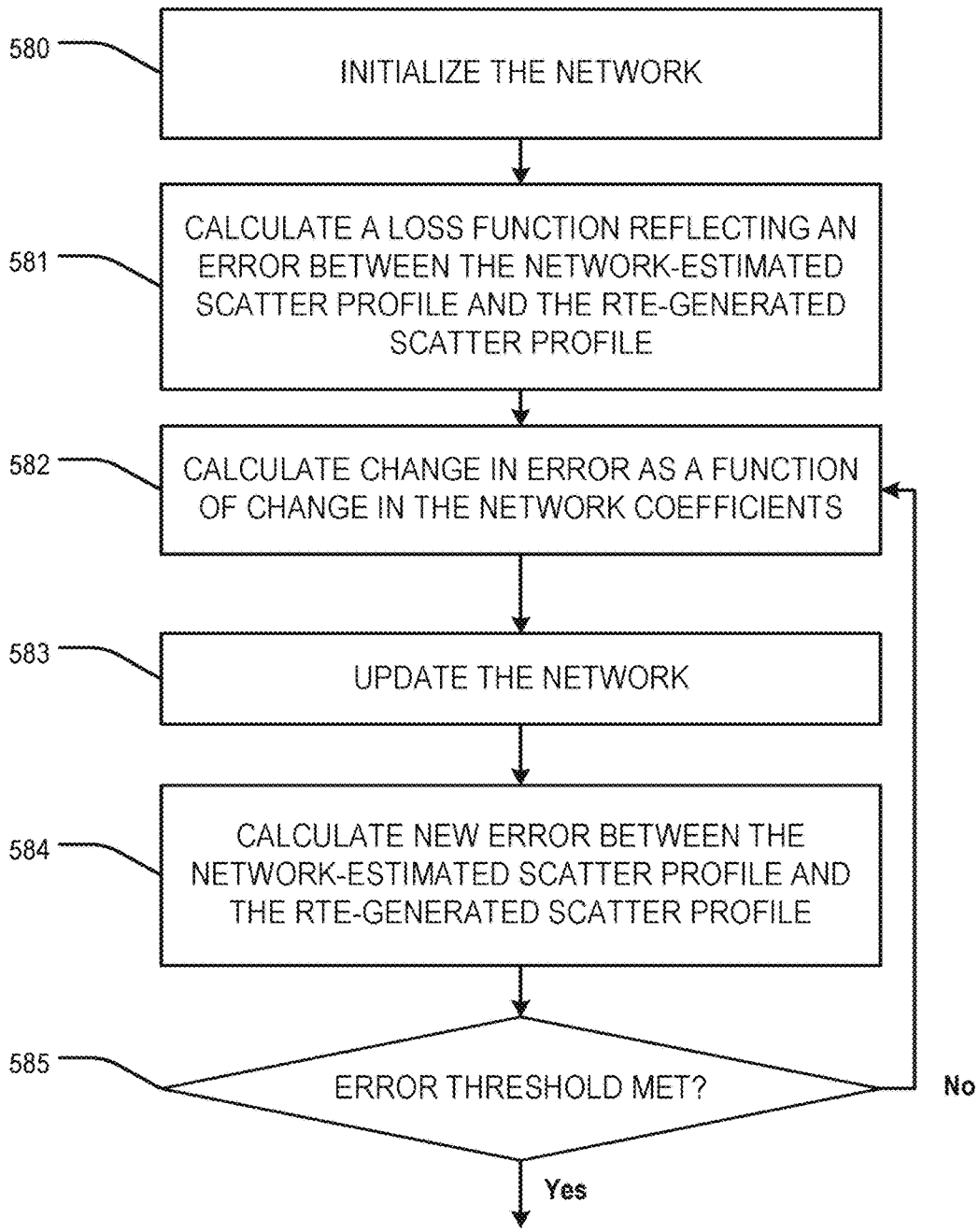
FIG. 5 is a flowchart of neural network training of the training phase of the method of scatter estimation and correction, according to an exemplary embodiment of the present disclosure.

Now, a more detailed description of FIG. 4 is provided. This description can be generalized, as would be understood by one of ordinary skill in the art. FIG. 5 shows a flow diagram of one implementation of the training step 224 performed during the scatter estimation method. In step 224 of the method, representative data from the training data database are used as training data to train a 3D CNN, resulting in the 3D CNN being output from step 585. The term "data" here can refer to an image of the training image database. More generally, data can be referred to as defect-exhibiting data, for which the "defect" can be any undesirable characteristic that can be affected through image acquisition (e.g. scatter) or image processing (e.g., noise or an artifact). In an example using training images for data, the offline training method of step 224 trains the 3D CNN using a large number of noisy training images (e.g., images containing primary flux and scatter flux) that are paired with corresponding noise-only training images (e.g., images containing scatter flux only estimated by RTE-method) to train the 3D CNN to estimate scatter flux from the noisy training images.

In step 224, a training database is accessed to obtain a plurality of datasets and the network is iteratively updated to reduce the error (e.g., the value produced by a loss function), wherein updating the network includes iteratively updating values of, for example, network coefficients, at each layer of the 3D CNN, such that the noisy data processed by the 3D CNN, increasingly, closely matches the scatter estimated by the RTE-method. In other words, 3D CNN infers the mapping implied by the training data, and the cost function produces an error value related to the mismatch between the data from the RTE-method and the output of the current iteration of the 3D CNN. For example, in certain implementations, the cost function can use the mean-square error to minimize the average squared error. In the case of a multi-layer perceptron (MLP) neural network, the backpropagation algorithm can be used for training the network by minimizing the mean-square-error-based cost function using a (stochastic) gradient descent method. A more-detailed discussion of updating of network coefficients can be found below with reference to FIG. 5.

Training a neural network model essentially means selecting one model from the set of allowed models (or, in a Bayesian framework, determining a distribution over the set of allowed models) that minimizes the cost criterion (i.e., the error value calculated using the cost function). Generally, the 3D CNN can be trained using any of numerous algorithms for training neural network models (e.g., by applying optimization theory and statistical estimation).

For example, the optimization method used in training the 3D CNN can use a form of gradient descent incorporating backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shanno, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods and particle swarm optimization, can also be used for training the 3D CNN.

With reference again to FIG. 5, the flow diagram is a non-limiting example of an implementation of training step 224 for training the 3D CNN using the training data. The data in the training data can be from any of the training datasets, comprising a plurality of sinograms, within the training database.

In step 580 of step 224, an initial guess is generated for the coefficients of the 3D CNN. For example, the initial guess can be based on a priori knowledge of the region being imaged or one or more exemplary denoising methods, edge-detection methods, and/or blob detection methods. Additionally, the initial guess can be based on one of the LeCun initialization, an Xavier initialization, and a Kaiming initialization.

Step 581 to step 585 provides a non-limiting example of an optimization method for training the 3D CNN. In step 581 of step 224, an error is calculated (e.g., using a loss function or a cost function) to represent a measure of the difference (e.g., a distance measure) between the RTE-method generated data (i.e., reference scatter profile, or ground truth) and the output data of the 3D CNN as applied in a current iteration of the 3D CNN. The error can be calculated using any known cost function or distance measure between the image data, including those cost functions described above. Further, in certain implementations the error/loss function can be calculated using one or more of a hinge loss and a cross-entropy loss. In an example, as described above, the loss function can be defined as the mean square error between the output of the 3D CNN ($S_{CNN}$) and the RTE-method generated data ($S_{RTE}$), or $$\frac{1}{n}\sum_{i=1}^{n} \|S_{RTE} - S_{CNN}\|^2$$

where n is the number for the training object. As described above, this loss can be minimized using optimization methods including, among others, stochastic gradient descent.

Additionally, the loss function can be combined with a regularization approach to avoid overfitting the network to the particular instances represented in the training data. Regularization can help to prevent overfitting in machine learning problems. If trained too long, and assuming the model has enough representational power, the network will learn the noise specific to that dataset, which is referred to as overfitting. In case of overfitting, the 3D CNN becomes a poor generalization, and the variance will be large because the noise varies between datasets. The minimum total error occurs when the sum of bias and variance are minimal. Accordingly, it is desirable to reach a local minimum that explains the data in the simplest possible way to maximize the likelihood that the trained network represents a general solution, rather than a solution particular to the noise in the training data. This goal can be achieved by, for example, early stopping, weight regularization, lasso regularization, ridge regularization, or elastic net regularization.

In certain implements the 3D CNN is trained using backpropagation. Backpropagation can be used for training neural networks and is used in conjunction with gradient descent optimization methods. During a forward pass, the algorithm computes the network's predictions based on the current parameters Θ. These predictions are then input into the loss function, by which they are compared to the corresponding ground truth labels (i.e., RTE-method generated data). During the backward pass, the model computes the gradient of the loss function with respect to the current parameters, after which the parameters are updated by taking a step size of a predefined size in the direction of minimized loss (e.g., in accelerated methods, such that the Nesterov momentum method and various adaptive methods, the step size can be selected to more quickly converge to optimize the loss function.)

The optimization method by which the backprojection is performed can use one or more of gradient descent, batch gradient descent, stochastic gradient descent, and mini-batch stochastic gradient descent. Additionally, the optimization method can be accelerated using one or more momentum update techniques in the optimization approach that results in faster convergence rates of stochastic gradient descent in deep networks, including, e.g., Nesterov momentum technique or an adaptive method, such as Adagrad sub-gradient method, an Adadelta or RMSProp parameter update variation of the Adagrad method, and an Adam adaptive optimization technique. The optimization method can also apply a second order method by incorporating the Jacobian matrix into the update step.

The forward and backward passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Returning to the non-limiting example shown in FIG. 5, step 582 of step 224 determines a change in the error as a function of the change in the network can be calculated (e.g., an error gradient) and this change in the error can be used to select a direction and step size for a subsequent change in the weights/coefficients of the 3D CNN. Calculating the gradient of the error in this manner is consistent with certain implementations of a gradient descent optimization method. In certain other implementations, this step can be omitted and/or substituted with another step in accordance with another optimization algorithm (e.g., a non-gradient descent optimization algorithm like simulated annealing or a genetic algorithm), as would be understood by one of ordinary skill in the art.

In step 583 of step 224, a new set of coefficients are determined for the 3D CNN. For example, the weights/coefficients can be updated using the change calculated in step 582, as in a gradient descent optimization method or an over-relaxation acceleration method.

In step 584 of step 224, a new error value is calculated using the updated weights/coefficients of the 3D CNN.

In step 585 of step 224, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations are reached. When the stopping criteria is not satisfied the training process performed in step 224 will continue back to the start of the iterative loop by returning and repeating step 582 using the new weights and coefficients (the iterative loop includes steps 582, 583, 584, and 585). When the stopping criteria are satisfied, the training process performed in step 224 is completed.

Figure 6:
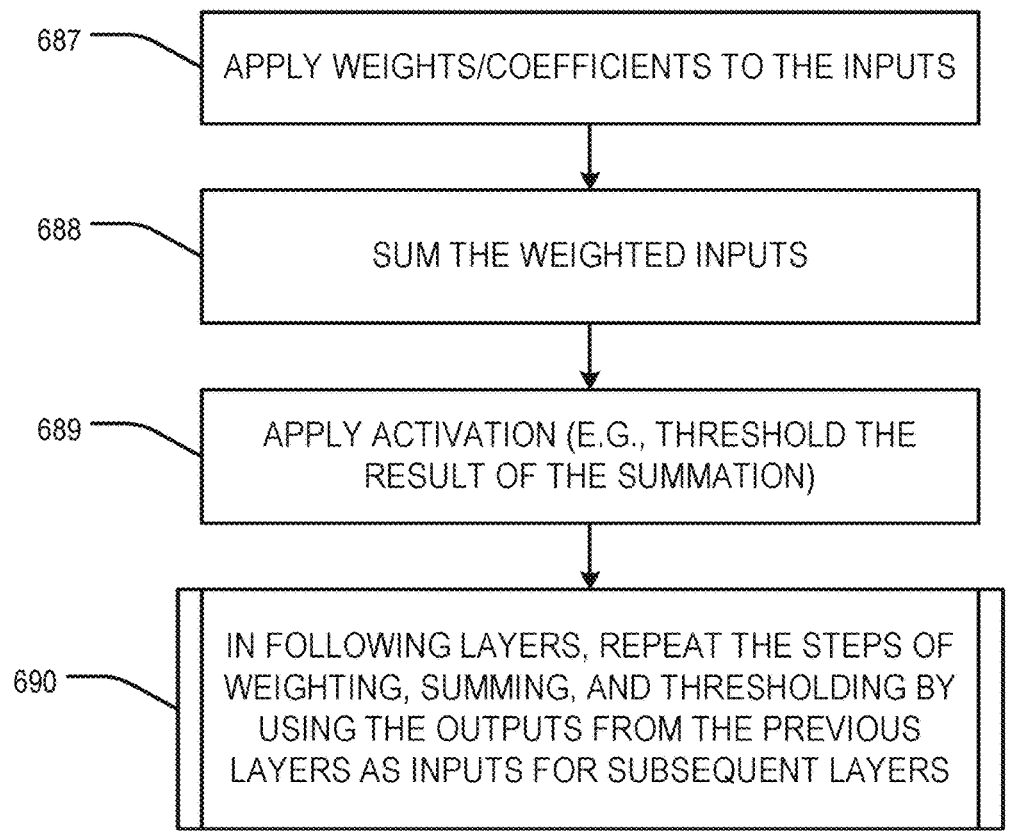
FIG. 6 is a generalized flowchart of implementation of an artificial neural network.
Figure 7:
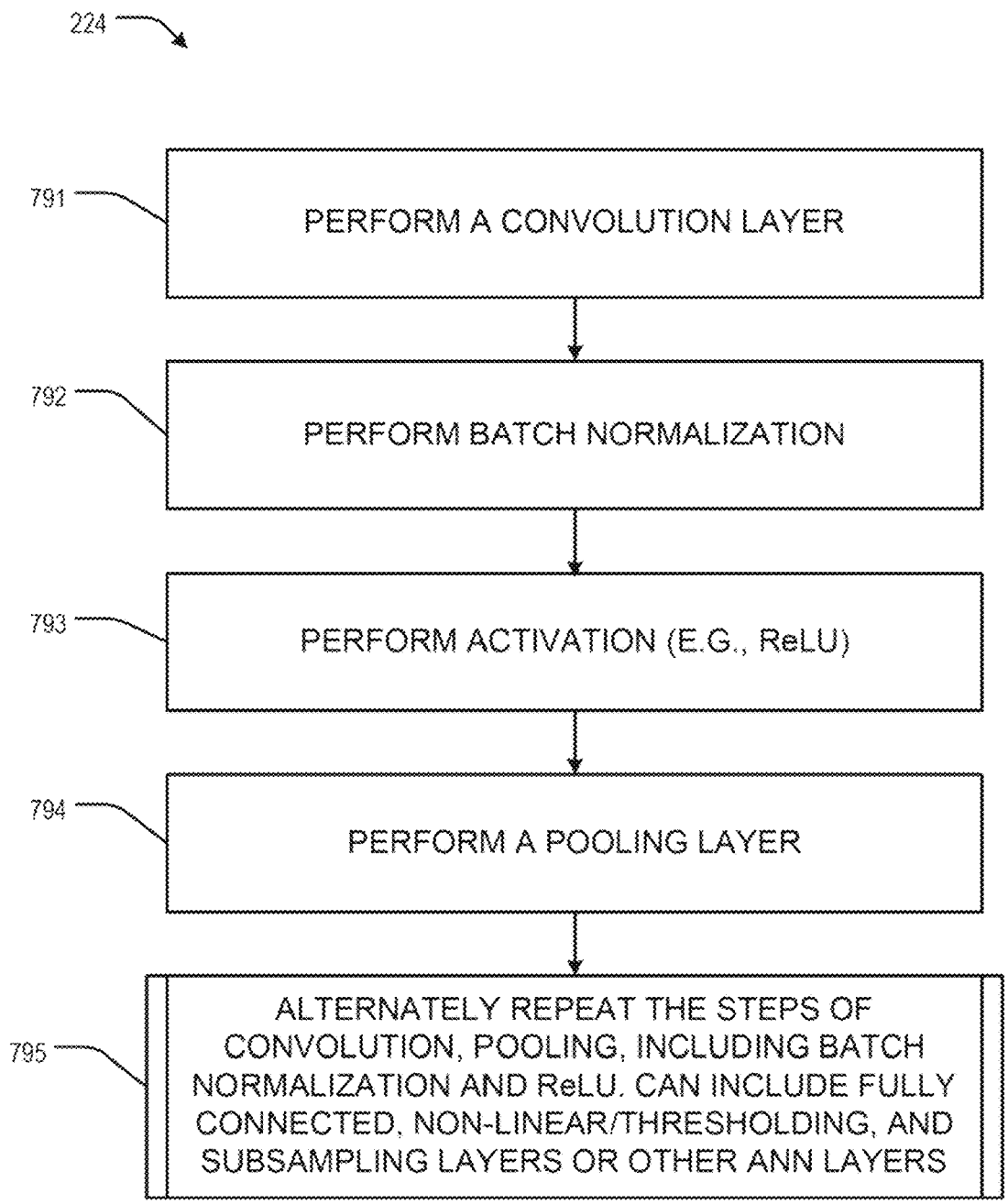
FIG. 7 is a flowchart of implementation of a convolutional neural network, according to an exemplary embodiment of the present disclosure.

FIG. 6 and FIG. 7 show flow diagrams of implementations of step 224 (from FIG. 2B). FIG. 6 is general for any type of layer in a feedforward artificial neural network (ANN), including, for example, fully connected layers, whereas FIG. 7 is specific to convolutional, pooling, batch normalization, and ReLU layers in a CNN. The 3D CNN can include both fully connected layers and convolutional, pooling, batch normalization, and ReLU layers, resulting in a flow diagram that is a combination of FIG. 6 and FIG. 7, as would be understood by one of ordinary skill in the art. The implementations of step 224 shown in FIG. 6 and FIG. 7 also correspond to applying the 3D CNN to the respective data, or training images, of the training dataset during process 220.

In step 687, the weights/coefficients corresponding to the connections between neurons (i.e., nodes) are applied to the respective inputs corresponding to, for example, the pixels of the training image.

In step 688, the weighted inputs are summed. When the only non-zero weights/coefficients connecting to a given neuron on the next layer are regionally localized in an image represented in the previous layer, the combination of step 687 and step 688 is essentially identical to performing a convolution operation.

In step 689, respective thresholds are applied to the weighted sums of the respective neurons.

In process 690, the steps of weighting, summing, and thresholding are repeated for each of the subsequent layers.

FIG. 7 shows a flow diagram of another implementation of step 224 (from FIG. 2B). The implementation of step 224 shown in FIG. 7 corresponds to operating on the training image at a hidden layer using a non-limiting implementation of the 3D CNN.

In step 791, the calculations for a convolution layer are performed as discussed in the foregoing and in accordance with the understanding of convolution layers of one of ordinary skill in the art.

In step 792, following convolution, batch normalization can be performed to control for variation in the output of the previous layer, as would be understood by one of ordinary skill in the art.

In step 793, following batch normalization, activation is performed according to the foregoing description of activation and in accordance with the understanding of activation of one of ordinary skill in the art. In an example, the activation function is a rectified activation function or, for example, a ReLU, as discussed above.

In another implementation, the ReLU layer of step 793 may be performed prior to the batch normalization layer of step 792.

In step 794, the outputs from the convolution layer, following batch normalization and activation, are the inputs into a pooling layer that is performed according to the foregoing description of pooling layers and in accordance with the understanding of pooling layers of one of ordinary skill in the art.

In process 795, the steps of a convolution layer, pooling layer, batch normalization layer, and ReLU layer can be repeated in whole or in part for a predefined number of layers. Following (or intermixed with) the above-described layers, the output from the ReLU layer can be fed to a predefined number of ANN layers that are performed according to the description provided for the ANN Layers in FIG. 6. The final output will be scatter estimation.

Figure 8A:
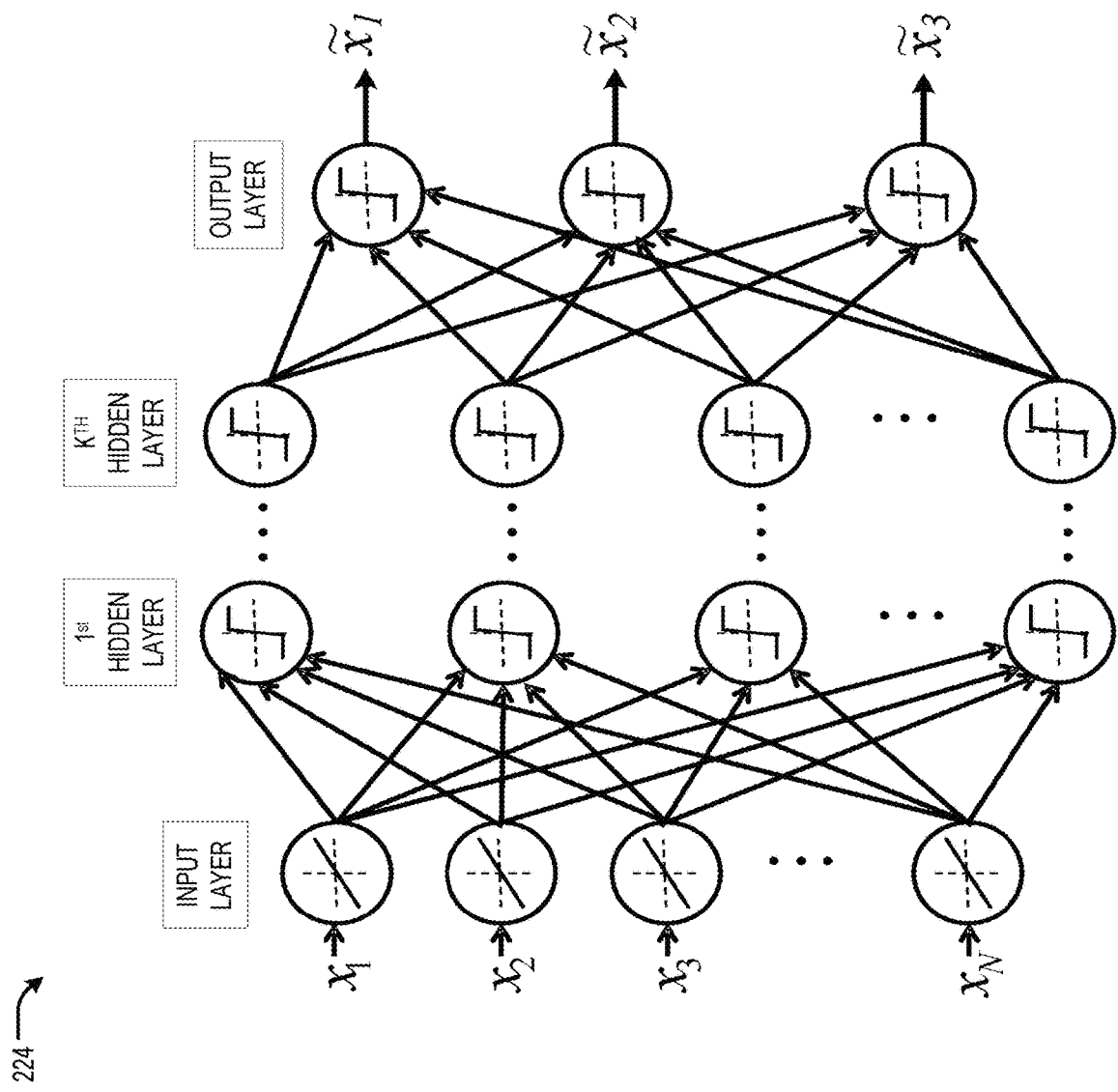
FIG. 8A is an example of a feedforward artificial neural network.
Figure 8C:
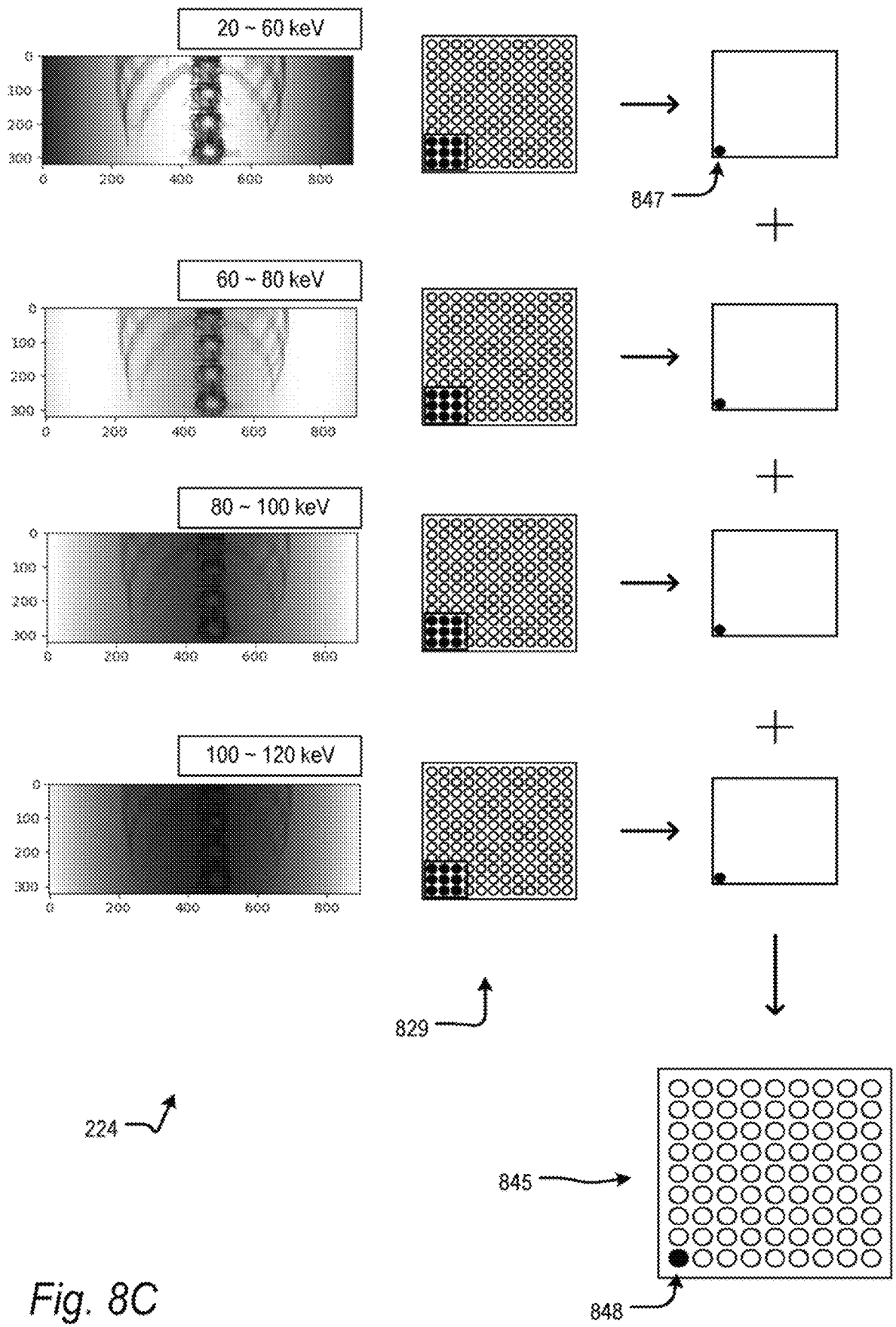
FIG. 8C is an example of an implementation of a convolutional neural network for one perceptron and neuron of the convolution layer, according to an embodiment of the present disclosure.

FIG. 8A, FIG. 8B, and FIG. 8C show various examples of the inter-connections between layers in the 3D CNN network. The 3D CNN can include fully connected, convolutional, pooling, batch normalization, and activation layers, all of which are explained above and below. In certain preferred implementations of the 3D CNN, convolutional layers are placed close to the input layer, whereas fully connected layers, which perform the high-level reasoning, are placed further down the architecture towards the loss function. Pooling layers can be inserted after convolutions and provide a reduction lowering the spatial extent of the filters, and thus the amount of learnable parameters. Batch normalization layers regulate gradient distractions to outliers and accelerate the learning process. Activation functions are also incorporated into various layers to introduce non-linearity and enable the network to learn complex predictive relationships. The activation function can be a saturating activation function (e.g., a sigmoid or hyperbolic tangent activation function) or rectified activation function (e.g., ReLU discussed above).

FIG. 8A shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The simplest ANN has three layers and is called an autoencoder. The 3D CNN can have more than three layers of neurons and have as many output neurons $\tilde{x}_N$ as input neurons, wherein N is the number of, for example, pixels in the training image. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can be further defined as a composition of other functions. This can be conveniently represented as a network structure, with arrows depicting the dependencies between variables, as shown in FIG. 8A, FIG. 8B, and FIG. 8C. For example, the ANN can use a nonlinear weighted sum, wherein $m(x)=K(\Sigma_i w_i n_i(x))$ and where K (commonly referred to as the activation function) is some predefined function, such as the hyperbolic tangent.

In FIG. 8A (and similarly in FIG. 8B), the neurons (i.e., nodes) are depicted by circles around a threshold function. For the non-limiting example shown in FIG. 8A, the inputs are depicted as circles around a linear function and the arrows indicate directed communications between neurons. In certain implementations, the 3D CNN is a feedforward network.

The 3D CNN of the present disclosure operates to achieve a specific task, such as estimating scatter within a CT image, by searching within the class of functions F to learn, using a set of observations, to find $m^* \in F$, which solves the specific task in some optimal sense (e.g., the stopping criteria used in step 585 of step 520 discussed above). For example, in certain implementations, this can be achieved by defining a cost function C: F→m such that, for the optimal solution m*, $C(m^*) \leq C(m) \forall m \in F$ (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

FIG. 8B shows a non-limiting example in which the 3D CNN is a convolutional neural network (CNN). CNNs are a type of ANN that have beneficial properties for image processing and, therefore, have special relevancy for applications of image denoising or, for example, scatter estimation and correction. CNNs use feed-forward ANNs in which the connectivity pattern between neurons can represent convolutions in image processing. For example, CNNs can be used for image-processing optimization by using multiple layers of small neuron collections which process portions of the input image, called receptive fields. The outputs of these collections can then be tiled so that they overlap to obtain a better representation of the original image. This processing pattern can be repeated over multiple layers having convolution and pooling layers, as shown, and can include batch normalization and activation layers.

As generally applied above, following after a convolution layer, a CNN can include local and/or global pooling layers which combine the outputs of neuron clusters in the convolution layers. Additionally, in certain implementations, the CNN can also include various combinations of convolutional and fully connected layers, with pointwise nonlinearity applied at the end of or after each layer.

CNNs have several advantages for image processing. To reduce the number of free parameters and improve generalization, a convolution operation on small regions of input is introduced. One significant advantage of certain implementations of CNNs is the use of shared weight in convolution layers, which means that the same filter (weights bank) is used as the coefficients for each pixel in the layer, both reducing memory footprint and improving performance. Compared to other image processing methods, CNNs advantageously use relatively little pre-processing. This means that the network is responsible for learning the filters that in traditional algorithms were hand-engineered. The lack of dependence on prior knowledge and human effort in designing features is a major advantage for CNNs.

FIG. 8C shows an example of a 3×3×4 kernel being applied to feature map values from an input layer, representing forward projection training data, to a first hidden layer. The first two dimensions refer to spatial dimensions of the forward projection training data, and the third dimension refers to the energy dimension. The kernel (i.e., a weighted sum defined by the weighting coefficients connecting the neuronal nodes in the respective layers) maps respective 3×3×4 pixel regions to corresponding neurons in the first hidden layer.

Specifically, FIG. 8C shows forward projection training data of a bone segmentation having four energy channels and being used for training of a 3D CNN. In FIG. 8C, the inputs, or channels, to the 3D CNN at an input layer at step 829, include forward projection training data of the bone segmentation at a variety of energy levels, which correspond to X-ray energy bins of an X-ray detector. In an example, the energy levels include 20-60 keV, 60-80 keV, 80-100 keV, and 100-120 keV.

In one non-limiting example, the 3D convolution is performed in two stages. At the input layer at step 829, a 3×3 convolution filter can be applied with a predefined stride to each channel input. Following convolution, a feature map at step 845 includes a neuron 847 representative of the 3×3 receptive field at step 829 for each channel, wherein the convolution of each channel at step 829 is summed using a weight sum such that a single neuron 848 reflects the contributions of each channel (i.e., energy level) to the first hidden layer at step 845. A similar approach to that described in FIG. 8C can be applied to an embodiment comprising a bone segmentation and water segmentation integrally or independently, having four or eight channels, as would be understood by one of ordinary skill in the art.

Figure 9:
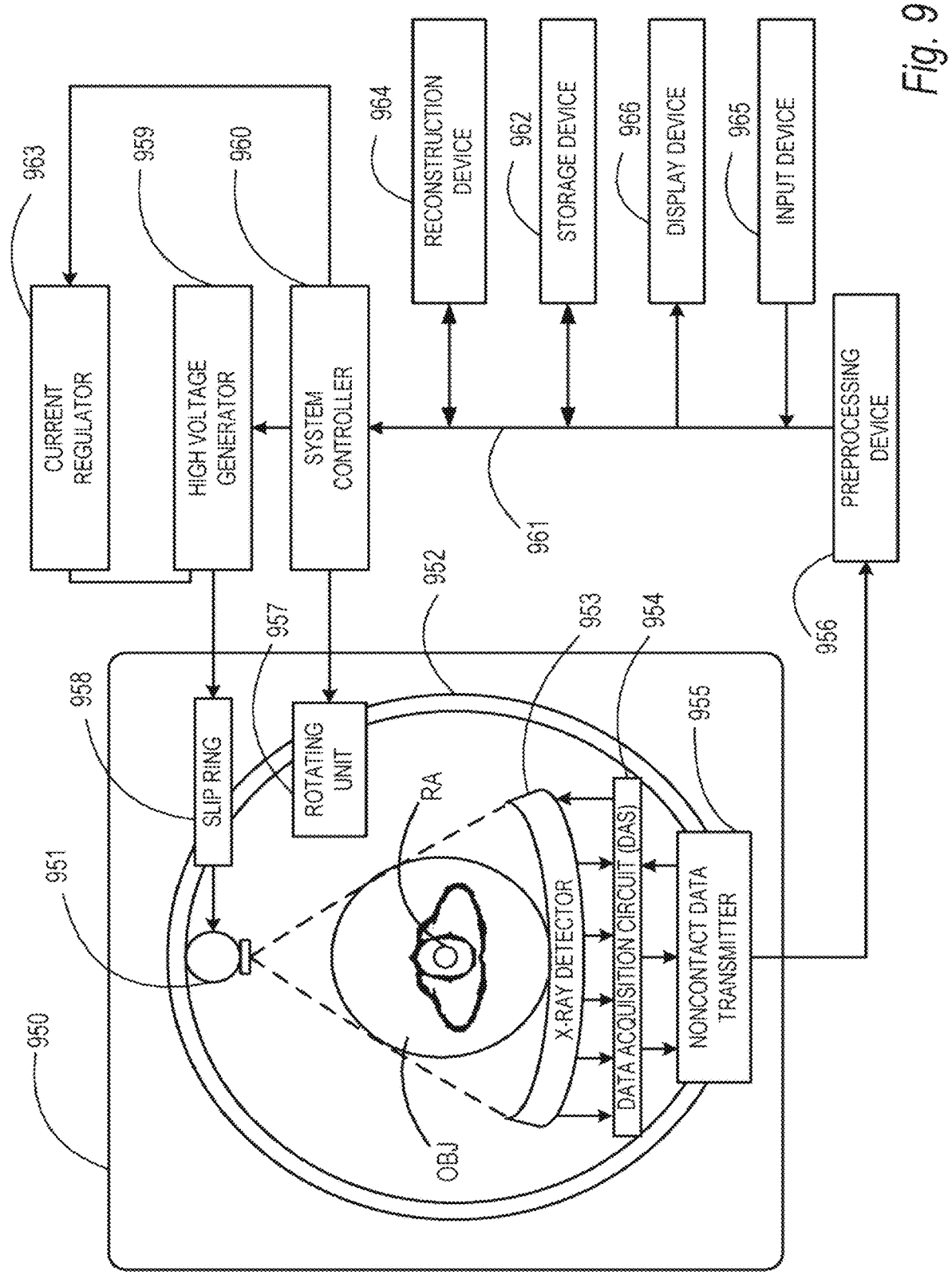
FIG. 9 is a schematic of an implementation of a computed tomography scanner, according to an exemplary embodiment of the present disclosure.

According to an embodiment of the present disclosure, the above-described deep learning-based methods can be implemented as applied to data from a CT apparatus or scanner. FIG. 9 illustrates an implementation of a radiography gantry included in a CT apparatus or scanner. As shown in FIG. 9, a radiography gantry 950 is illustrated from a side view and further includes an X-ray tube 951, an annular frame 952, and a multi-row or two-dimensional-array-type X-ray detector 953. The X-ray tube 951 and X-ray detector 953 are diametrically mounted across an object OBJ on the annular frame 952, which is rotatably supported around a rotation axis RA. A rotating unit 957 rotates the annular frame 952 at a high speed, such as 0.4 sec/rotation, while the object OBJ is being moved along the axis RA into or out of the illustrated page.

An embodiment of an X-ray CT apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate-type, which is currently the mainstream, will be exemplified.

The multi-slice X-ray CT apparatus further includes a high voltage generator 959 that generates a tube voltage applied to the X-ray tube 951 through a slip ring 958 so that the X-ray tube 951 generates X-rays. The X-rays are emitted towards the object OBJ, whose cross-sectional area is represented by a circle. For example, the X-ray tube 951 having an average X-ray energy during a first scan that is less than an average X-ray energy during a second scan. Thus, two or more scans can be obtained corresponding to different X-ray energies. The X-ray detector 953 is located at an opposite side from the X-ray tube 951 across the object OBJ for detecting the emitted X-rays that have transmitted through the object OBJ. The X-ray detector 953 further includes individual detector elements or units.

The CT apparatus further includes other devices for processing the detected signals from the X-ray detector 953. A data acquisition circuit or a Data Acquisition System (DAS) 954 converts a signal output from the X-ray detector 953 for each channel into a voltage signal, amplifies he signal, and further converts the signal into a digital signal. The X-ray detector 953 and the DAS 954 are configured to handle a predetermined total number of projections per rotation (TPPR).

The above-described data is sent to a preprocessing device 956, which is housed in a console outside the radiography gantry 950 through a non-contact data transmitter 955. The preprocessing device 956 performs certain corrections, such as sensitivity correction, on the raw data. A memory 962 stores the resultant data, which is also called projection data at a stage immediately before reconstruction processing. The memory 962 is connected to a system controller 960 through a data/control bus 961, together with a reconstruction device 964, input device 965, and display 966. The system controller 960 controls a current regulator 963 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 951 and the X-ray detector 953 are diametrically mounted on the annular frame 952 and are rotated around the object OBJ as the annular frame 952 is rotated about the rotation axis RA. In the fourth-generation geometry system, the detectors are fixedly placed around the patient and an X-ray tube rotates around the patient. In an alternative embodiment, the radiography gantry 950 has multiple detectors arranged on the annular frame 952, which is supported by a C-arm and a stand.

The memory 962 can store the measurement value representative of the irradiance of the X-rays at the X-ray detector unit 953. Further, the memory 962 can store a dedicated program for executing the CT image reconstruction, material decomposition, and scatter estimation and correction methods including methods of FIG. 2A, FIG. 2B, FIG. 2C, FIG. 2D, FIG. 3A, FIG. 3B, FIG. 3C, FIG. 3D, FIG. 4, FIG. 5, FIG. 6, FIG. 7, FIG. 8A, FIG. 8B, and FIG. 8C, described herein.

The reconstruction device 964 can execute the above-referenced methods, described herein. Further, reconstruction device 964 can execute pre-reconstruction processing image processing such as volume rendering processing and image difference processing as needed.

The pre-reconstruction processing of the projection data performed by the preprocessing device 956 can include correcting for detector calibrations, detector nonlinearities, and polar effects, for example.

Post-reconstruction processing performed by the reconstruction device 964 can include filtering and smoothing the image, volume rendering processing, and image difference processing, as needed. The image reconstruction process can be performed using filtered back projection, iterative image reconstruction methods, or stochastic image reconstruction methods. The reconstruction device 964 can use the memory to store, e.g., projection data, forward projection training data, training images, uncorrected images, calibration data and parameters, and computer programs.

The reconstruction device 964 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VDHL, Verilog, or any other hardware description language and the code may be stored in an electronic memory directly within the FPGA or CPLD, or as a separate electronic memory. Further, the memory 962 can be non-volatile, such as ROM, EPROM, EEPROM or FLASH memory. The memory 962 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 964 can execute a computer program including a set of computer-readable instructions that perform the functions described herein, the program being stored in any of the above-described non-transitory electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft 10, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 966. The display 966 can be an LCD display, CRT display, plasma display, OLED, LED or any other display known in the art.

The memory 962 can be a hard disk drive, CD-ROM drive, DVD drive, FLASH drive, RAM, ROM or any other electronic storage known in the art.

Embodiments of the present disclosure may also be as set forth in the following parentheticals.

(1) An apparatus, comprising processing circuitry configured to obtain projection data representing an intensity of X-ray radiation detected at a plurality of detector elements during a computed tomography (CT) scan, generate, based on the projection data, (i) a first plurality of energy-resolved projection images corresponding to a first material component of the material components and (ii) a second plurality of energy-resolved projection images corresponding to a second material component of the material components, acquire a neural network including weighting coefficients of connections between neuronal nodes of respective layers of a plurality of layers between an input layer and an output layer of the neural network, the neural network being a trained neural network, apply the first plurality of energy-resolved projection images together with the second plurality of energy-resolved projection images to the trained neural network to estimate an X-ray scatter flux of the projection data, and remove, using the estimated X-ray scatter flux, a scatter component from the projection data to generate corrected projection data representing an intensity of a primary X-ray beam isolated from the X-ray scatter flux.

(2) The apparatus according to (1), wherein the processing circuitry is further configured to generate the first plurality of energy-resolved projection images and the second plurality of energy-resolved projection images by reconstructing, from the projection data, a reconstructed image, segmenting the reconstructed image into material-component images corresponding to respective material components, and forward projecting each of the material-component images to respectively generate the first plurality of energy-resolved projection images and the second plurality of energy-resolved projection images.

(3) The apparatus according to either (1) or (2), wherein the processing circuitry is further configured to segment the reconstructed images into material-component images based on radiodensity values of pixels or voxels in the reconstructed images and/or a material decomposition.

(4) The apparatus according to any of (1) to (3), wherein the trained neural network is a convolutional neural network.

(5) The apparatus according to any of (1) to (4), wherein training the neural network comprises minimizing a loss function, the loss function being a mean square error between a scatter estimation of a neural network and a scatter estimation of a model-based method.

(6) The apparatus according to any of (1) to (5), wherein the model-based method is a radiative transfer equation-based method.

(7) The apparatus according to any of (1) to (6), wherein the radiative transfer equation-based method employs spherical harmonics.

(8) The apparatus according to any of (1) to (7), wherein the neural network is trained on a spectrum of X-ray energy levels.

(9) The apparatus according to any of (1) to (8), wherein training the neural network comprises learning on forward projections of segmented training images.

(10) The apparatus according to any of (1) to (9), wherein the forward projections of the segmented training images are performed by calculation of a propagation path length.

(11) The apparatus according to any of (1) to (10), wherein training the neural network comprises training on a plurality of training images generated from a training projection database, the training projection database comprising a plurality of phantom training projection dataset and a plurality of patient training projection dataset.

(12) The apparatus according to any of (1) to (11), wherein the processing circuitry is further configured to generate the first plurality of energy-resolved projection images and the second plurality of energy-resolved projection images by performing material decomposition on the projection data to decompose respective projection views in the projection data into a plurality of material components, and determining, for each projection view and material component, a corresponding plurality of energy-resolved projection images corresponding to respective energy bins of X-ray energies.

(13) An apparatus, comprising processing circuitry configured to train a neural network to estimate, based on a plurality of energy-resolved projection images of respective material components, an X-ray scatter flux corresponding to the plurality of energy-resolved projection images, the neural network being trained by obtaining a training dataset including input images that are paired with respective target images, the respective target images being a desired result of applying the input images to the neural network, the target images representing an X-ray scatter flux of the input images, and the input images representing a plurality of energy-resolved projection images that are resolved according to a plurality of energy bins and that are separated according material component, initializing the neural network, the neural network including neuronal nodes connected by connections having weighting coefficients, and the initializing of the neural network including initializing the weighting coefficients, applying the input images to the neural network to generate an output image, calculating a loss function representing a difference or disagreement between the output image and the target images, updating the weighting coefficients in the neural network to optimize the cost function, and stopping, upon satisfying a predefined stopping criteria, the updating of the weighting coefficients, and then outputting the neural network as a trained neural network.

(14) The apparatus according to (13), wherein the processing circuitry is further configured to train the neural network by generating the target images of the training dataset from the training projection data by estimating the X-ray scatter flux using a radiative transfer equation (RTE)-based scatter method on the training projection data, the RTE-based scatter method calculating the X-ray scatter flux using an integral equation that is approximated using n lowest-order terms of a spherical harmonic expansion, wherein n is an integer greater than two (one) that provides a predefined precision.

(15) The apparatus according to either (13) or (14), wherein the processing circuitry is further configured to train the neural network by generating the input images of the training dataset from the training projection data by reconstructing, based on the training projection data, a computed tomography (CT) image, segmenting the CT image into two or more material-component images corresponding to respective material components, and forward projecting each of the material-component images to generate a respective plurality of energy-resolved projection images that are resolved into energy bins of an X-ray energy.

(16) The apparatus according to any of (13) to (15), wherein the processing circuitry is further configured to train the neural network, wherein the neural network is a three-dimensional convolutional neural network (3D-CNN) including two spatial dimensions of the energy-resolved projection images and a third dimension of the 3D-CNN being an energy dimension of an angle dimension of a plurality of view angles represented in the training projection data.

(17) The apparatus according to any of (13) to (16), wherein the processing circuitry is further configured to train the neural network by downsampling the training projection data to generate input images and target images that, relative to a native resolution of the training projection data, have a coarser resolution.

(18) The apparatus according to any of (13) to (17), wherein the processing circuitry is further configured to train the neural network by upsampling, upon stopping the updating of the weighting coefficients, the neural network such that the neural network has resolution that is the native resolution of the training projection data.

(19) A method, comprising obtaining, via processing circuitry, projection data representing an intensity of X-ray radiation detected at a plurality of detector elements during a computed tomography (CT) scan, generating, via the processing circuitry and based on the projection data, (i) a first plurality of energy-resolved projection images corresponding to a first material component of the material components and (ii) a second plurality of energy-resolved projection images corresponding to a second material component of the material components, acquiring, via the processing circuitry, a neural network including weighting coefficients of connections between neuronal nodes of respective layers of a plurality of layers between an input layer and an output layer of the neural network, the neural network being a trained neural network, applying, via the processing circuitry, the first plurality of energy-resolved projection images together with the second plurality of energy-resolved projection images to the trained neural network to estimate an X-ray scatter flux of the projection data, and removing, via the processing circuitry and using the estimated X-ray scatter flux, a scatter component from the projection data to generate corrected projection data representing an intensity of a primary X-ray beam in an absence of X-ray scatter.

(20) A non-transitory computer-readable storage medium storing computer-readable instructions that, when executed by a computer, cause the computer to perform a method of performing a scatter estimation and correction, comprising obtain projection data representing an intensity of X-ray radiation detected at a plurality of detector elements during a computed tomography (CT) scan, generate, based on the projection data, (i) a first plurality of energy-resolved projection images corresponding to a first material component of the material components and (ii) a second plurality of energy-resolved projection images corresponding to a second material component of the material components, acquire a neural network including weighting coefficients of connections between neuronal nodes of respective layers of a plurality of layers between an input layer and an output layer of the neural network, the neural network being a trained neural network, apply the first plurality of energy-resolved projection images together with the second plurality of energy-resolved projection images to the trained neural network to estimate an X-ray scatter flux of the projection data, and correct, using the estimated X-ray scatter flux, the projection data to generate corrected projection data representing an intensity of a primary X-ray beam in an absence of X-ray scatter.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:
1. An apparatus, comprising:
processing circuitry configured to
obtain projection data representing an intensity of X-ray radiation detected at a plurality of detector elements during a computed tomography (CT) scan,
generate, based on the projection data, (i) a first plurality of energy-resolved projection images corresponding to a first material component of the material components and (ii) a second plurality of energy-resolved projection images corresponding to a second material component of the material components,
acquire a neural network including weighting coefficients of connections between neuronal nodes of respective layers of a plurality of layers between an input layer and an output layer of the neural network, the neural network being a trained neural network,
apply the first plurality of energy-resolved projection images together with the second plurality of energy-resolved projection images to the trained neural network to estimate an X-ray scatter flux of the projection data, and
remove, using the estimated X-ray scatter flux, a scatter component from the projection data to generate corrected projection data representing an intensity of a primary X-ray beam isolated from the X-ray scatter flux.

2. The apparatus according to claim 1, wherein the processing circuitry is further configured to generate the first plurality of energy-resolved projection images and the second plurality of energy-resolved projection images by reconstructing, from the projection data, a reconstructed image, segmenting the reconstructed image into material-component images corresponding to respective material components, and forward projecting each of the material-component images to respectively generate the first plurality of energy-resolved projection images and the second plurality of energy-resolved projection images.

3. The apparatus according to claim 2, wherein the processing circuitry is further configured to segment the reconstructed images into material-component images based on radiodensity values of pixels or voxels in the reconstructed images and/or a material decomposition.

4. The apparatus according to claim 1, wherein the trained neural network is a convolutional neural network.

5. The apparatus according to claim 1, wherein training the neural network comprises minimizing a loss function, the loss function being a mean square error between a scatter estimation of a neural network and a scatter estimation of a model-based method.

6. The apparatus according to claim 5, wherein the model-based method is a radiative transfer equation-based method.

7. The apparatus according to claim 6, wherein the radiative transfer equation-based method employs spherical harmonics.

8. The apparatus according to claim 1, wherein the neural network is trained on a spectrum of X-ray energy levels.

9. The apparatus according to claim 1, wherein training the neural network comprises learning on forward projections of segmented training images.

10. The apparatus according to claim 9, wherein the forward projections of the segmented training images are performed by calculation of a propagation path length.

11. The apparatus according to claim 1, wherein training the neural network comprises training on a plurality of training images generated from a training projection database, the training projection database comprising a plurality of phantom training projection dataset and a plurality of patient training projection dataset.

12. The apparatus according to claim 1, wherein the processing circuitry is further configured to generate the first plurality of energy-resolved projection images and the second plurality of energy-resolved projection images by performing material decomposition on the projection data to decompose respective projection views in the projection data into a plurality of material components, and determining, for each projection view and material component, a corresponding plurality of energy-resolved projection images corresponding to respective energy bins of X-ray energies.

13. An apparatus, comprising:

processing circuitry configured to train a neural network to estimate, based on a plurality of energy-resolved projection images of respective material components, an X-ray scatter flux corresponding to the plurality of energy-resolved projection images, the neural network being trained by obtaining a training dataset including input images that are paired with respective target images, the respective target images being a desired result of applying the input images to the neural network, the target images representing an X-ray scatter flux of the input images, and the input images representing a plurality of energy-resolved projection images that are resolved according to a plurality of energy bins and that are separated according material component, initializing the neural network, the neural network including neuronal nodes connected by connections having weighting coefficients, and the initializing of the neural network including initializing the weighting coefficients, applying the input images to the neural network to generate an output image, calculating a loss function representing a difference or disagreement between the output image and the target images, updating the weighting coefficients in the neural network to optimize the cost function, and stopping, upon satisfying a predefined stopping criteria, the updating of the weighting coefficients, and then outputting the neural network as a trained neural network.

14. The apparatus according to claim 13, wherein the processing circuitry is further configured to train the neural network by generating the target images of the training dataset from the training projection data by estimating the X-ray scatter flux using a radiative transfer equation (RTE)-based scatter method on the training projection data, the RTE-based scatter method calculating the X-ray scatter flux using an integral equation that is approximated using n lowest-order terms of a spherical harmonic expansion, wherein n is an integer greater than two (one) that provides a predefined precision.

15. The apparatus according to claim 13, wherein the processing circuitry is further configured to train the neural network by generating the input images of the training dataset from the training projection data by reconstructing, based on the training projection data, a computed tomography (CT) image, segmenting the CT image into two or more material-component images corresponding to respective material components, and forward projecting each of the material-component images to generate a respective plurality of energy-resolved projection images that are resolved into energy bins of an X-ray energy.

16. The apparatus according to claim 13, wherein the processing circuitry is further configured to train the neural network, wherein the neural network is a three-dimensional convolutional neural network (3D-CNN) including two spatial dimensions of the energy-resolved projection images and a third dimension of the 3D-CNN being an energy dimension of an angle dimension of a plurality of view angles represented in the training projection data.

17. The apparatus according to claim 13, wherein the processing circuitry is further configured to train the neural network by downsampling the training projection data to generate input images and target images that, relative to a native resolution of the training projection data, have a coarser resolution.

18. The apparatus according to claim 17, wherein the processing circuitry is further configured to train the neural network by upsampling, upon stopping the updating of the weighting coefficients, the neural network such that the neural network has resolution that is the native resolution of the training projection data.

19. A method, comprising:
obtaining, via processing circuitry, projection data representing an intensity of X-ray radiation detected at a plurality of detector elements during a computed tomography (CT) scan;
generating, via the processing circuitry and based on the projection data, (i) a first plurality of energy-resolved projection images corresponding to a first material component of the material components and (ii) a second plurality of energy-resolved projection images corresponding to a second material component of the material components;
acquiring, via the processing circuitry, a neural network including weighting coefficients of connections between neuronal nodes of respective layers of a plurality of layers between an input layer and an output layer of the neural network, the neural network being a trained neural network;
applying, via the processing circuitry, the first plurality of energy-resolved projection images together with the second plurality of energy-resolved projection images to the trained neural network to estimate an X-ray scatter flux of the projection data; and
removing, via the processing circuitry and using the estimated X-ray scatter flux, a scatter component from the projection data to generate corrected projection data representing an intensity of a primary X-ray beam in an absence of X-ray scatter.

20. A non-transitory computer-readable storage medium storing computer-readable instructions that, when executed by a computer, cause the computer to perform a method of performing a scatter estimation and correction, comprising:
obtain projection data representing an intensity of X-ray radiation detected at a plurality of detector elements during a computed tomography (CT) scan;
generate, based on the projection data, (i) a first plurality of energy-resolved projection images corresponding to a first material component of the material components and (ii) a second plurality of energy-resolved projection images corresponding to a second material component of the material components;
acquire a neural network including weighting coefficients of connections between neuronal nodes of respective layers of a plurality of layers between an input layer and an output layer of the neural network, the neural network being a trained neural network;
apply the first plurality of energy-resolved projection images together with the second plurality of energy-resolved projection images to the trained neural network to estimate an X-ray scatter flux of the projection data; and
correct, using the estimated X-ray scatter flux, the projection data to generate corrected projection data representing an intensity of a primary X-ray beam in an absence of X-ray scatter.

* * * * *